United States Patent [19]

Kurz et al.

[11] 4,235,579
[45] Nov. 25, 1980

[54] SYNTHETIC PLASTICS ARTICLE MANUFACTURING SYSTEM

[75] Inventors: John H. Kurz, Scottsdale; Edward E. Batson, Glendale, both of Ariz.

[73] Assignee: Leesona Corporation, Beaverton, Mich.

[21] Appl. No.: 904,734

[22] Filed: May 11, 1978

[51] Int. Cl.³ .................. B29C 17/04; B29C 17/10; B41F 7/02
[52] U.S. Cl. .................. 425/174.4; 101/144; 101/416 A; 264/37; 264/550; 264/132; 264/296; 264/DIG. 69; 425/342.1; 425/387.1; 425/398
[58] Field of Search .............. 425/174.4, 388, 398, 425/404, 445, 387.1, 342.1; 264/93, 94, 321, 51, 53, 160, 156, 132, 296, 550, 37, DIG. 69; 101/416 A, 144

[56] References Cited

U.S. PATENT DOCUMENTS

| | | | |
|---|---|---|---|
| 2,676,416 | 4/1954 | Calosi et al. | 101/416 A X |
| 3,148,103 | 9/1964 | Gallagher | 264/160 X |
| 3,189,399 | 6/1965 | Jacobs et al. | 264/321 X |
| 3,238,565 | 3/1966 | Jacobs | 264/321 X |
| 3,240,851 | 3/1966 | Scalora | 264/153 |
| 3,259,060 | 7/1966 | Martin | 101/144 |
| 3,470,281 | 9/1969 | Knowles | 264/94 |
| 3,479,694 | 11/1969 | Winstead | 264/51 X |
| 3,577,495 | 5/1971 | Pearl et al. | 264/156 X |
| 3,723,582 | 3/1973 | Winstead | 264/53 X |
| 3,770,860 | 11/1973 | Amberg et al. | 264/94 X |
| 3,771,938 | 11/1973 | Pinto et al. | 425/174.4 |
| 3,789,095 | 1/1974 | Winstead | 264/53 X |
| 3,827,356 | 8/1974 | Snow et al. | 264/132 X |
| 3,886,247 | 5/1975 | Edwards | 264/94 |
| 3,960,081 | 6/1976 | Gustavs et al. | 101/416 A |
| 3,966,860 | 6/1976 | Hudson | 264/94 |

FOREIGN PATENT DOCUMENTS 2422873 11/1975 Fed. Rep. of Germany ...... 101/416 A
1504291 3/1978 United Kingdom ................ 101/416 A Primary Examiner—Philip Anderson
Attorney, Agent, or Firm—Learman & McCulloch

[57] ABSTRACT

An extruder or the like, continuously issues a heated plastics material in the form of an elongated web, which is moved sequentially to molding and article severing stations. The products cut out are moved to lip rolling printing and drying stations. Articles such as containers are formed by the mechanism which includes a turntable assembly for varying the length of the web travel path between an extruder and forming station to thereby control the residual heat in the web at the time of forming, and a molding drum with improved plug assist devices which are air powered and also include air emitting ports to move the web into intimate engagement with the mold cavities as a final forming step under controlled conditions which assure that the pressure is applied at exactly the proper time. The system includes a lip curling system which feeds containers severed from the web in stepwise fashion through forming roll sections and releases them in timed relation to indexible mandrels. The system further includes a printing assembly which utilizes offset printing mechanism in combination with the mandrels, and associated ink drying mechanism, to print the containers prior to releasing or ejecting them.

31 Claims, 20 Drawing Figures

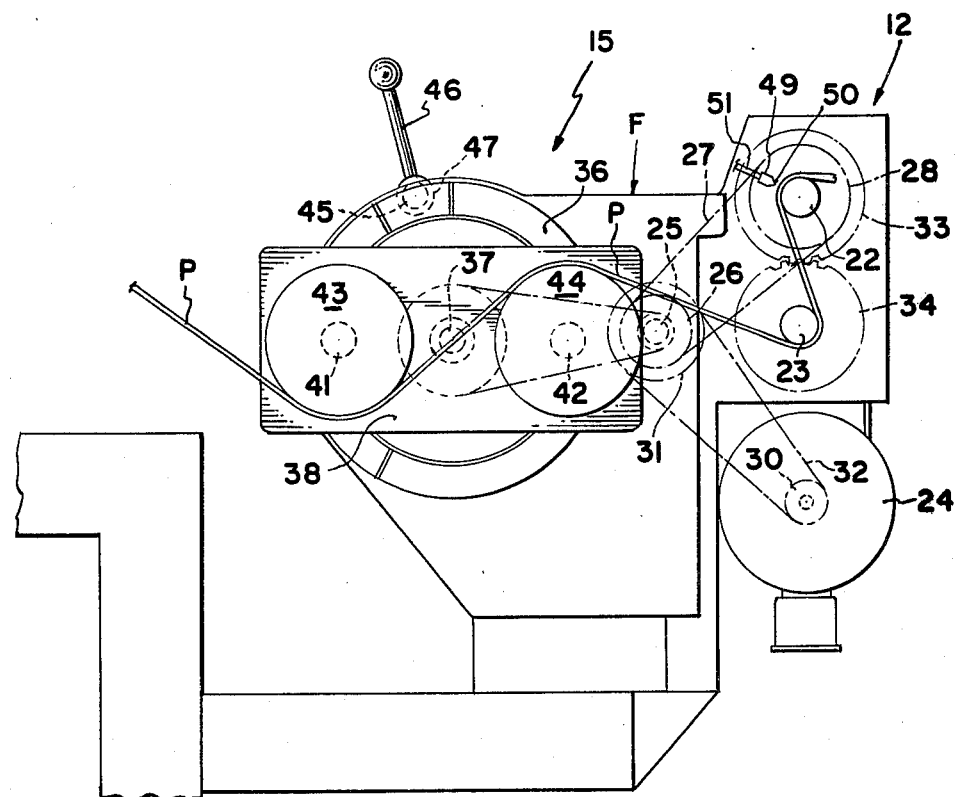
FIG.2
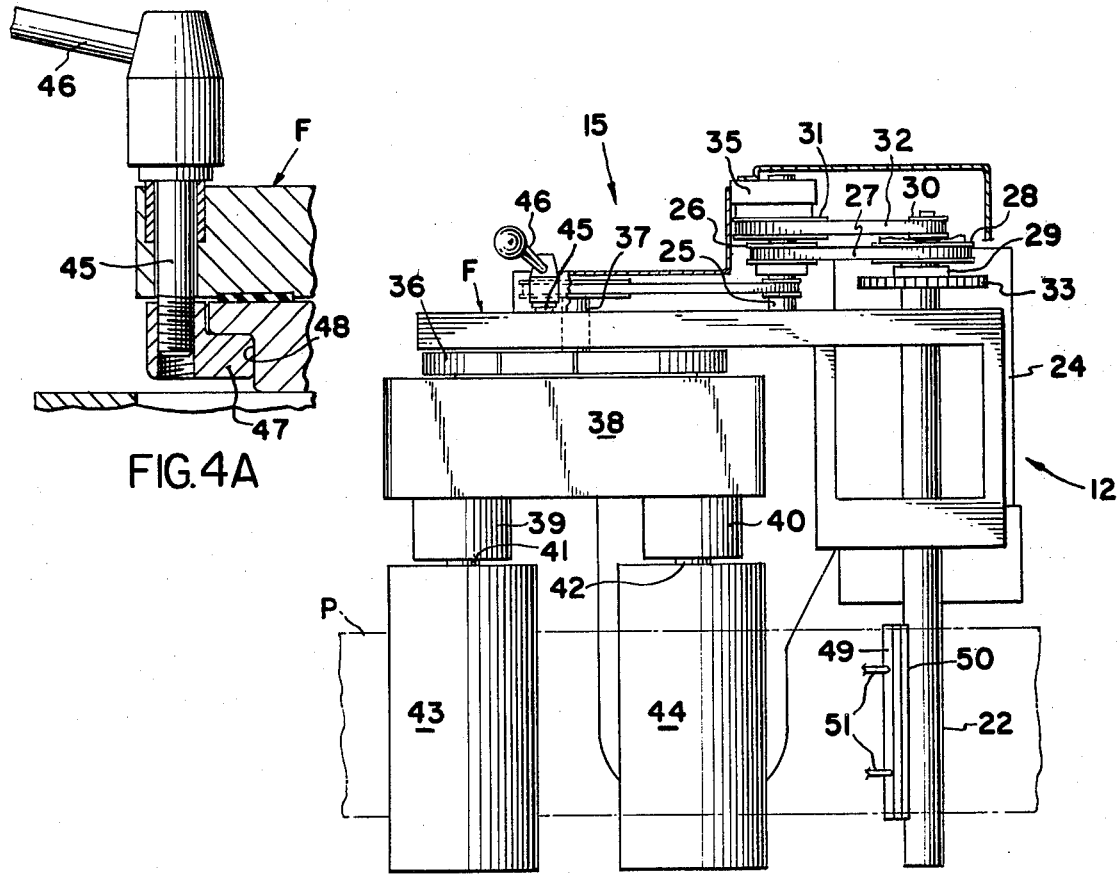
FIG.4A
FIG.3

SYNTHETIC PLASTICS ARTICLE MANUFACTURING SYSTEM

TECHNICAL FIELD

The invention relates generally to "in line" methods and apparatus for molding articles in synthetic plastic web material and processing them through rim curling and printing stations, and more particularly to apparatus for forming frustoconical plastic containers in a plastic web which is issued from an extruder and continuously fed to an endlessly traveling multiple-mold device which forms the containers one at a time. The containers are subsequently severed from the web and processed individually by lip curling and printing equipment.

BACKGROUND OF THE INVENTION

Previously, a lid making machine, which was manufactured by a predecessor of applicants' assignee, incorporated mechanism for extruding plastic into an elongated continuous web and then moving the web continuously in sequence through forming, printing, and cut-out stations. In this machine, using the residual extrusion heat, portions of the web were first deformed into a continuous series of articles supported and interconnected by undeformed intervals of web. This machine did not incorporate the improvements disclosed and claimed in the present application, but U.S. Pat. Nos. cited, which relate generally to this earlier prior art machine, are listed herebelow:

Scalora 3,240,851
Crenshaw 3,454,693
Startin et al 3,590,108
Pearl et al 3,577,495
Baldanga 2,889,651
Gallagher 3,148,103
Karfiol et al 2,404,073

BRIEF SUMMARY OF THE INVENTION

The invention relates to certain improvements made in container forming systems, particularly of the type where, using the residual extrusion heat, portions of a web are fed continuously to a drum or the like, and in a continuous manner mold a series of articles in the web. The claimed improvements relate to the incorporation of web path guide mechanism which is shiftable to multiple positions for varying the length of the web travel path between the extruder and forming stations, to certain plug assist drive and pressure port mechanism which is utilized in the container forming drum, to a multiple-step rim or lip forming mechanism which delivers containers which are cut from the web in a final step individually to indexible container holding mandrels which are associated with offset printing mechanism, and to certain improvements incorporated in the overall printing machine assembly and associated mechanisms which relate to the manner in which the container supporting mandrels are revolved about their axes while, at the same time, they are being indexed from a position in which they receive a container to a printing station, a drying station and an ejection station.

IN THE DRAWINGS

FIG. 2 is an enlarged fragmentary, side elevational view illustrating certain web guide turntable mechanism which is provided between the extrusion issuing die and the forming station;

FIG. 3 is a top plan view thereof;

FIG. 4A is an enlarged fragmentary plan view illustrating the cam lock for securing the turntable in adjusted position;

FIG. 18 is a diagrammatic view illustrating a rudimentary electrical circuit which can be employed.

GENERAL DESCRIPTION

Figure 1:
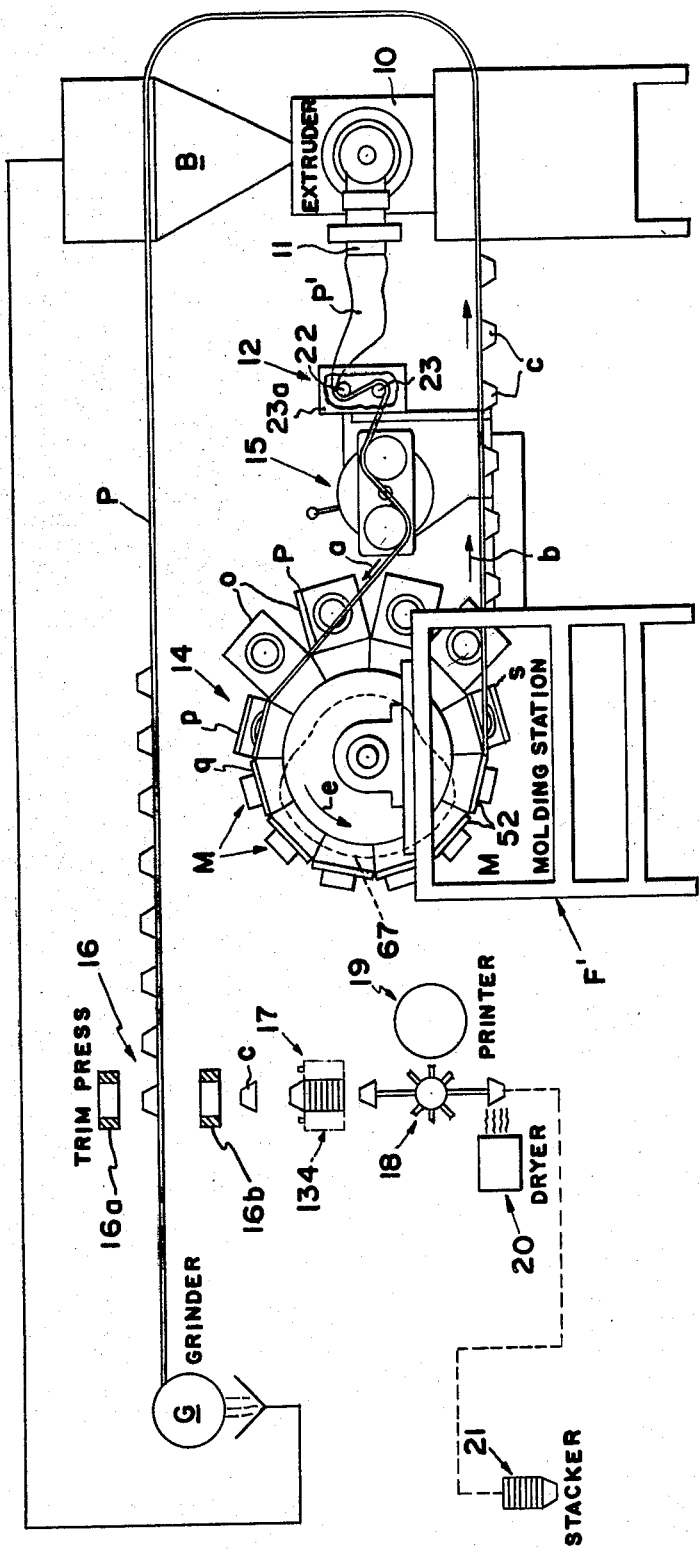
FIG. 1 is a schematic, side elevational view illustrating the sequence of steps followed by articles being manufactured.

Referring now, in the first instance, particularly to FIG. 1 of the drawings, a system is disclosed for producing articles such as containers from raw plastic pellets. For example, the system disclosed can produce dairy containers with tapered printed side walls, ranging in size from 8 to 34 ounces, at a rate of 150 to 200 units per minute. Various polyolefin plastics, including polystyrene and filled or unfilled polypropylene can be processed in this "in line" extrusion and thermoforming process at reduced production costs.

Typically an extruder 10 is employed, which has a plastics issuing orifice head 11 for extruding a continuous annular tube P' of plastic through an axial annular orifice (not shown) in head 11. While only a single extruder, which is supplied with resin material from a material supply bin B is shown, it is to be understood that a coextrusion process employing a primary extruder and a coextruder may also be used. For the sake of simplicity, the extruder 10 is shown only schematically, inasmuch as extruders for issuing the plastic P' in tubular or bubble form are market items which are well-known in the art.

From the extruder head 11, the continuously issuing plastic bubble is passed to web draw roll mechanism generally indicated 12, which collapses the tubular plastic extrusion tube to form a thin, thoroughly fused double wall elongated web P and the warm web then continuously passes to a molding drum station generally designated 14, via a guide roll turntable device generally designated 50, which can be adjusted to vary the path length of the plastic web P.

As indicated in FIG. 1, the plastic web P is passed in the direction a to the upper portion of the revolving drum mold device 14 and is discharged from the lower end thereof, as indicated by the arrow b. The drum device 14 includes a series of side-by-side molds M which form the web P into a line of spaced apart container cavities c, separated by undeformed intervals of web. The formed web P proceeds then circuitously to a trim press station generally designated 16, which is conventional in character, and includes an upper die 16a and a lower die 16b for trimming the containers c and severing them from the plastic web P. The scrap proceeds to a grinder 17, at which containers c drop through lower die 16b to a lip rolling device generally designated 17, which will be more particularly described.

From lip rolling device 17, the containers drop individually in timed sequence to a revolvable mandrel assembly generally designated 18, which moves them past an offset printing mechanism generally designated 19 and thence to a drying device generally designated 20, prior to ejecting them for stacking as indicated at 21. Reject rates in the system are extremely low and the "in line" extrusion and thermoforming process not only saves energy but results in improved material performance characteristics. The consistency of the product is excellent because lateral orientation is no problem and reduced degradation results from the single heat history to the extent that even when the containers are crumpled, they do not crack.

Scrap is drawn directly into the granulator 17 and automatically recycled, via line 20, along with virgin resin through the extruder 10.

THE WEB FEED MECHANISM

The draw roll means 12 includes a pair of vertically spaced water-cooled draw rolls 22 and 23, mounted on support 24 downstream from extruder 10. A conventional plastics extruder 10 may heat the plastic molding material, such as impact polystyrene, to a practical extrusion temperature in the range of 400°—450° F. The warm plastic which then continuously extrudes through the annular die orifice and forms the continuous annular tube P' is collapsed by the rolls 22 and 23 into a continuous fused web of warm and deformable plastic which has a thickness twice that of the walls of extruded tube P' and typically may be on the order of 0.012 inches total web thickness. The tube width and thickness can be very accurately controlled. The extruded plastic tube P', moving to the left in FIG. 1, passes over upper chilled draw roll 22, then between the rolls and under lower chilled draw roll 23, and emerges as a flattened web P also moving to the left in FIG. 1. The rolls 22 and 23 are cooled just enough to prevent the plastic from sticking and remove essentially no extrusion heat, so the flattening of the collapsed tube walls results in an integral fusion of the still warm and deformable plastic.

A variable speed motor 24 (FIGS. 2 and 3) is provided to drive the rolls 22 and 23 via a frame journaled jack shaft 25 which, via a belt 27 mounted on sheave 26, drives a sheave 28 on a shaft 29 on which upper roll 22 is fixed. The output shaft of motor 24 includes a motor pulley 30 which drives a pulley 31 on the jack shaft 25 via belt 32. A gear 33 on shaft 29 is then provided to drive a gear 34 on the like shaft which mounts the lower roll 23. Suitable bearings 35 can be used to support the jack shaft 25 via the machine frame F.

Provided just downstream of web draw roll mechanism 12, is a web path guide mechanism 15 which comprises a turntable assembly 36 revolvably mounted on a shaft 37. The turntable assembly 36 includes a mount block 38 (FIG. 3) with bearings 39 and 40 supporting 180° opposed idler shafts 41 and 42. A pair of rolls 43 and 44 are mounted on the shafts 41 and 42, as shown in FIGS. 2 and 3, and in one position (FIG. 2) of the turntable 36, the plastic web P proceeding from web draw roll collapsing mechanism 12 on its way to the forming drum assembly 14, passes over the roll 44 thence laterally and under the roll 43. The frame F revolvably supports a shaft 45 operated by a handle member 46, and a cam lock 47 (FIG. 4A) eccentrically provided on shaft 45 is rotatable into friction locked engagement with a shoulder surface 48 provided on turntable 36 to lock the turntable in any angularly adjusted position.

Figure 4:
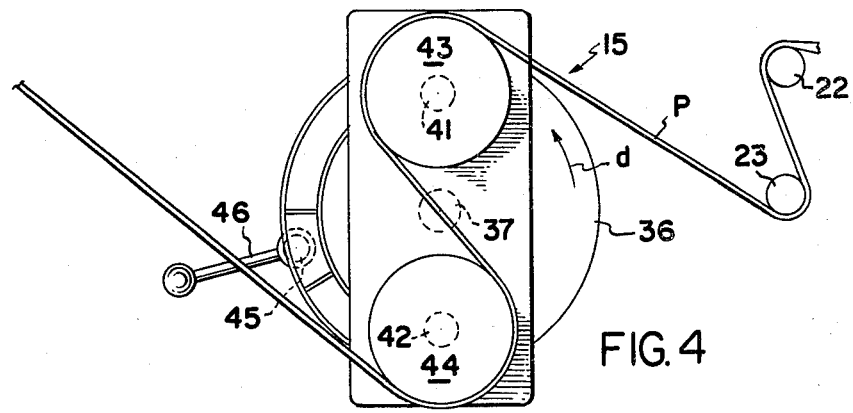
FIG. 4 is a view similar to FIG. 3, indicating an adjusted position of the turntable device.

FIG. 4 illustrates an adjusted position of turntable 37 in which it has been moved counterclockwisely in the direction of the arrow d in FIG. 4 to dispose the rolls 43 and 44 in vertically juxtaposed position. As will be clear from a comparison of FIGS. 2 and 4, this has the effect of increasing the path of the plastic web P between stations 12 and 14 so that the plastic web P will be somewhat cooler when it reaches forming drum 14. Varied angular positions of turntable 37 are possible since the friction locking cam 47 can lock turntable 37 in any rotary position to achieve a fine tuning of the forming temperature. It should be appreciated that rolls 43 and 44 are, like rolls 22 and 23, conventional temperature controlled rolls in which a coolant is circulated via a coolant circulating system such as disclosed in Brown U.S. Pat. No. 2,994,514. Only a slight degree of cooling sufficient to prevent sticking is accomplished, since it is desired to maintain the plastic at molding temperature.

The bubble P' collapsing operation is aided by an air knife device 49 which is of a width equal to the width of plastic web P and directs a stream of warm air, at a predetermined pressure, at the plastic web through nozzle 50. Air knife 49 can also be employed to control web temperature, since the air may be supplied at a predesignated higher or lower temperature, via pressure lines 51, as desired for a particular process.

THE MOLDING STATION

The elongated plastic web P is fed continuously to the article molding drum generally designated 14 as indicated in FIG. 1, and it should be understood that the drum assembly 14 comprises an endless series of molding assemblies M which include hingedly mounted mold-containing covers 52. Covers of this general character for forming lids were used in the lid-forming machine mentioned previously and applicants' improved construction is involved with the plug assist assembly 53 utilized, which will be described later in detail.

As indicated in FIGS. 1 and 5-7 particularly, the web P advances first of all to the top of the molding wheel 14 which is driven counterclockwisely in the direction e, the web being moved at the same linear velocity as the angular peripheral velocity of wheel 14. The cooled web, carrying the series of formed articles C, such as containers of frustoconical configuration, leaves the molding wheel 180° or so later, at the lower end thereof. Since the plastic web P and wheel periphery travel at the same velocity, the mold covers 52 quickly close and clamp upon the web and move through 180° or so of wheel rotation as portions of the web are molded. The mold covers 52 then quickly open to release the now deformed web to subsequent processing stations. By the time the plastic web leaves the mold wheel 14, it has cooled considerably to a temperature which may be 100° F., for example. As FIGS. 1 and 5-7 particularly indicate, the mold drum assembly includes a frame, generally designated F' which, at its upper ends, support bearings 54 and 55 for journaling a drive shaft 56. A suitable motor 57 is connected to drive shaft 56, which mounts not only molding drum 14, but a cam track wheel 57. The purpose of cam wheel 57 will later be described.

Figure 5:
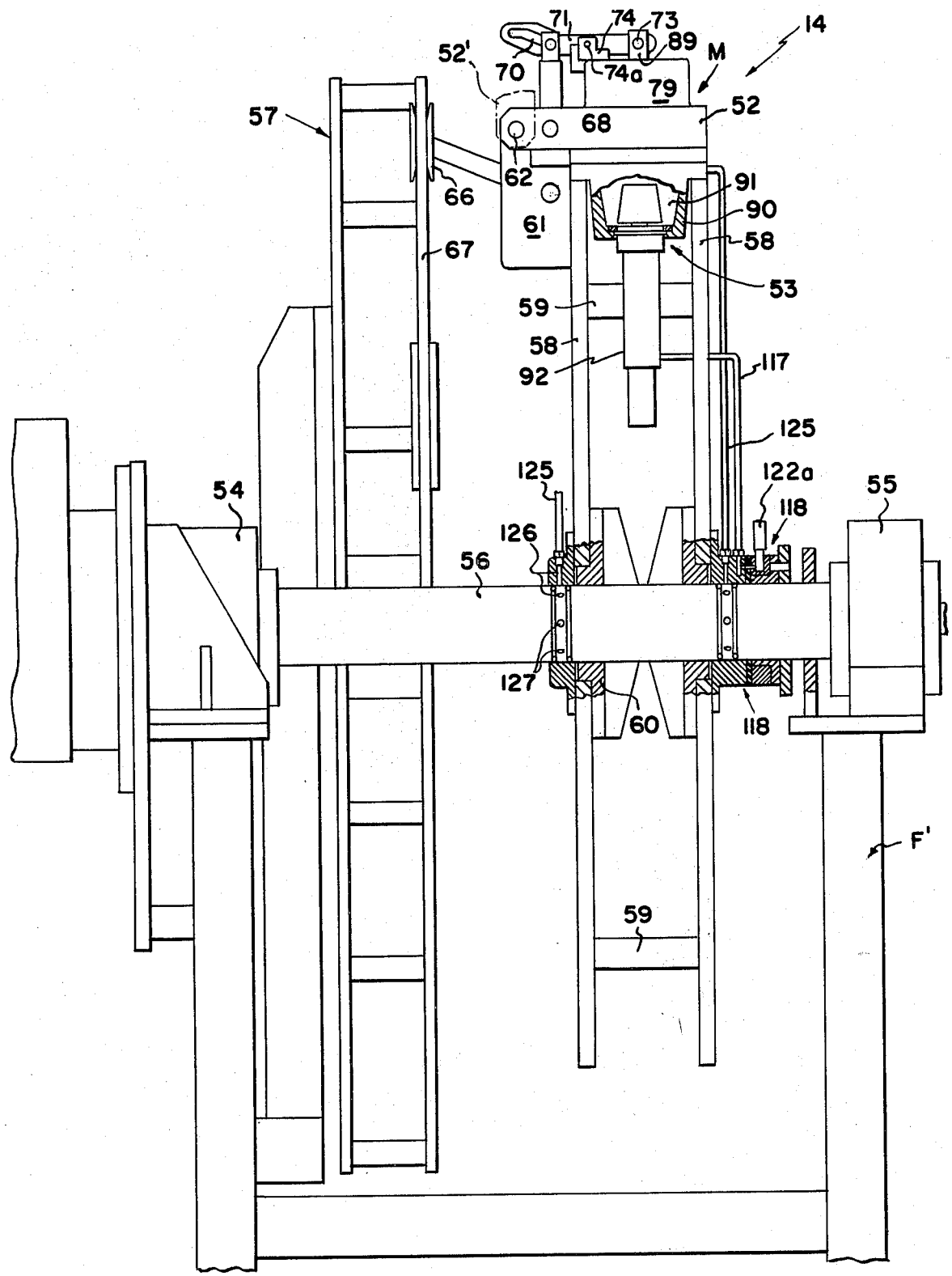
FIG. 5 is a transverse, sectional view of the mold drum which is employed at the molding station, portions of the drum being partly broken away to illustrate some of the mechanism which is incorporated therein.

As FIG. 5 indicates, the mold wheel 14 may comprise a pair of side plates 58 braced by members 59 affixed to a bearing assembly 60 keyed to shaft 56. The inner side plate 58, as shown in FIG. 5, is provided with a series of brackets 61 having pivot pins 62 hingedly mounting the mold covers 52 for pivotal movement (from the open position shown at o in FIG. 1, for example, through the partially closed position p to the closed position shown at q in FIG. 1.)

Figure 7:
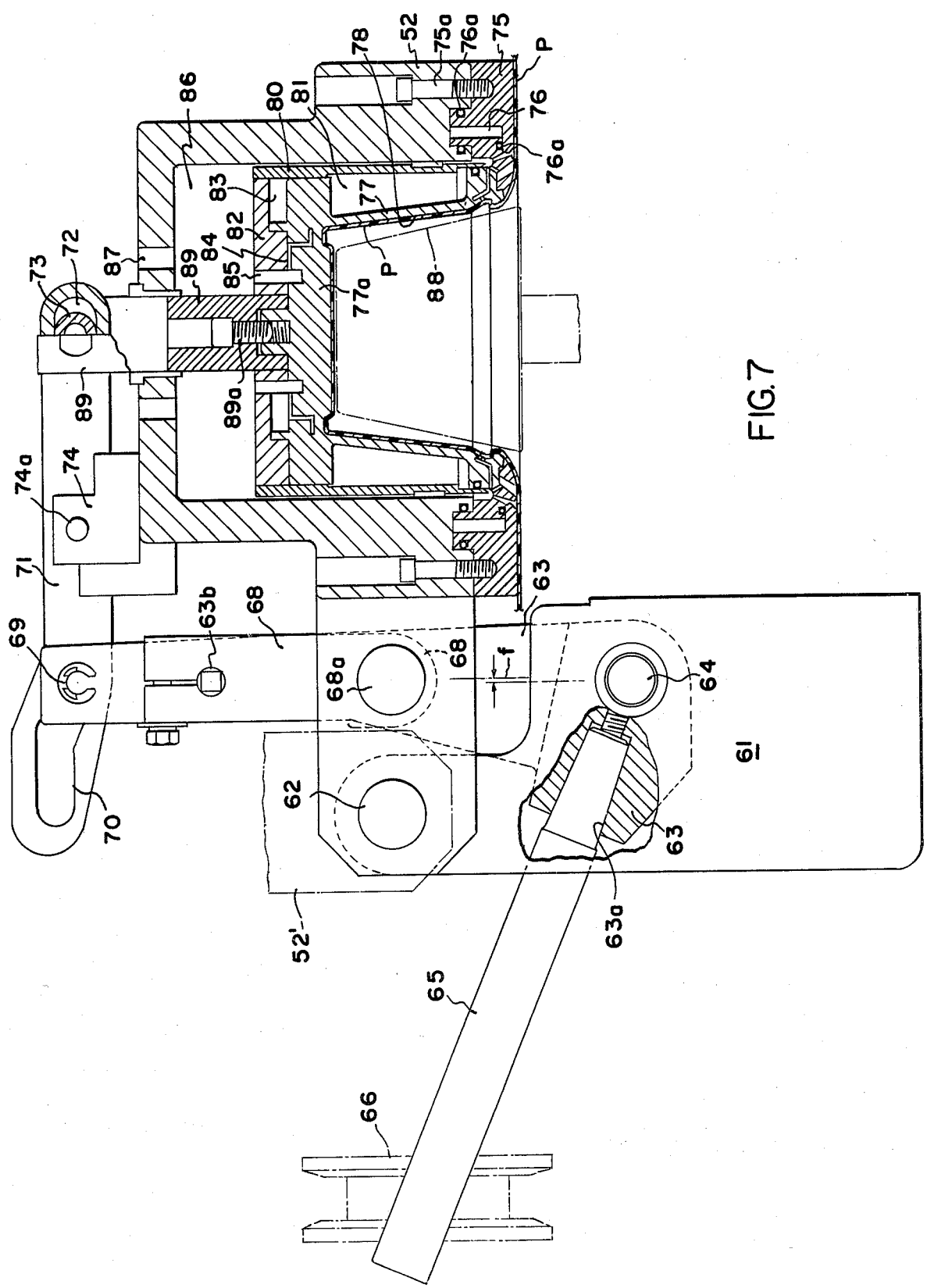
FIG. 7 is an enlarged fragmentary, side elevational view, which is partly in section to illustrate one of the molds which is utilized.

In FIGS. 5 and 7, the cover 52 is illustrated in its closed position but its open position is illustrated diagrammatically in FIG. 5 at 52'. Each cover or lid 52 is quickly opened and closed by a cam operated toggle linkage in a manner which will now be described. In FIG. 7, a bell crank lever 63 is shown as pivoted at 64 to the bracket 61 and it should be appreciated that bracket 61 is clevised to receive a cam follower arm 65 which has a follower 66 received by the cam track 67 of the cam wheel 57. The configuration of cam track 67 is illustrated in FIG. 1. At its opposite end, each cam follower rod 65 is fixed within an opening 63a provided in bell crank lever 63.

At its upper end, the lever 63 is pivotally connected by a pin 63b to a link 68. Link 68 pivotally connects to cover 52 by pin 63a. Lever 63 has a pin 69 riding in a slot 70 in a top link 71 which also has a front slot 72 receiving a pin 73 provided on a central post 89 which projects above cover 52. Top link 71 pivots on pin 74a which is supported on a clevis 74 fixed on cover 52. In locked position the links 63 and 68 are in a slightly "beyond center" position, as indicated at f, in which they lock the cover 52 in closed, sealed position until such time as cam track 67 causes the pivoting of the bell crank 63 to first break the lock and then the seal connection, and cause the cover 52 to pivot counterclockwisely about pivot 62 in FIG. 7 to open position. Pivoting of bell crank 63 first returns it from "over center" position and then causes movement of pin 69 in slot 70, in effect lifting central post 89 which retracts or strips mold 78 from the formed plastic part.

Figure 6:
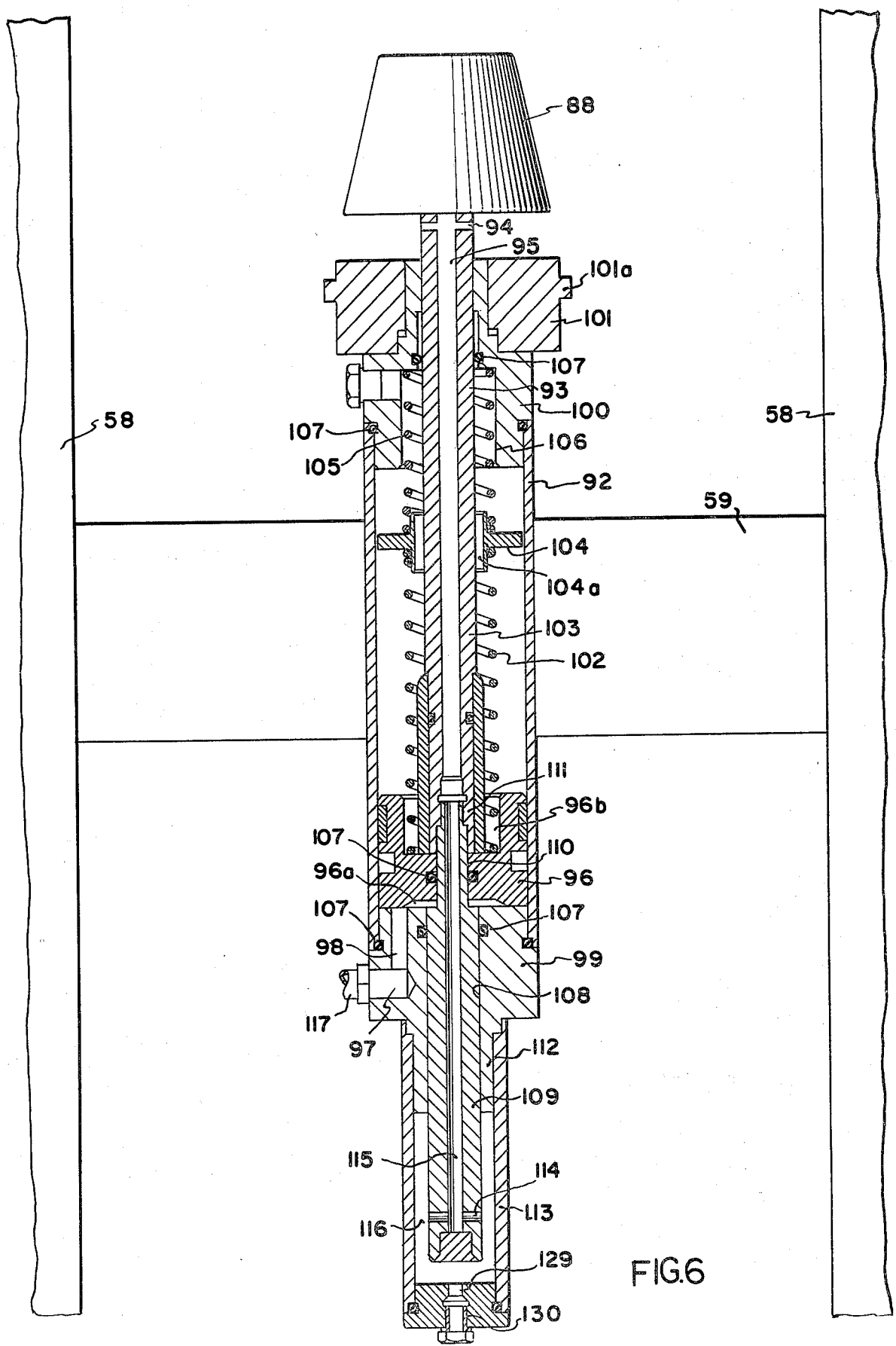
FIG. 6 is an enlarged, sectional elevational view illustrating one of the plug assist assemblies which is employed in the mold drum, the plug assist member being shown in retracted position.

FIG. 7 is a partly sectional view which, together with FIGS. 5 and 6, illustrates the construction of each mold assembly M, and particularly illustrates the female mold parts which are carried by each cover 52. Each cover 52 comprises an outer housing 79, carrying a clamp ring portion 75 secured by bolts 75a. A coolant passage 76, which is sealed as by rings 76a from the remainder of the construction, is provided so that when ring 75 presses against the plastic web it freezes a peripheral ring of plastic around the side wall liner 77 of the cavity which, together with part 77a, forms the mold cavity 78. Other mold parts include a liner 80, surrounding a coolant passage 81, and a top plate 82 which encloses a coolant passage 83. Coolant is circulated in these passages in the usual manner, via any commercially available circulating system such as the one previously mentioned. Air exhaust passages 84 are provided between the members 77, 77a and 82 and lead to a passage 85 in plate 82 to permit air to pass through the chamber 86 to atmosphere via a port 87. It is these passages 84, 85, 86, and 87 which exhaust or bleed air from the mold cavity 78 when the plug assist member 88 moves the web P into the mold cavity. Central post 89 supports part 77a via bolts 89a.

As FIG. 5 particularly indicates, each cover 52 mates with a cup-shaped base part 90 over which the plastic web P is drawn when the cover is in open position. The parts 90 are supported by the drum side plates 58 and each provides an air chamber 91 below the cavity which surrounds the plug assist member 88 when it is in its lower position as shown in FIG. 5.

An air cylinder assembly 92 (see FIGS. 6 and 6A) is provided to drive each plug assist 88 and is held in fixed position on base part 90. Provided as an integral part of each plug assist 88 is a tubular shaft 93 having air outlet ports 94 at its upper end which communicate with the passageway 95 in each tube 93. Each tube 93 is fixed to a piston member 96 which is forced outwardly in cylinder 92 when air under pressure is applied to ports 97 and 98 provided in lower cylinder head 99, in a manner to be presently described. At the upper end of each cylinder 92 is cylinder head 100 having a reduced upper end received by a mount block 101, which is received within the lower end of each base part 90 and has keys 101a maintaining its interconnected relationship therewith.

At its lower end, piston 96 has a recess 96a which communicates with passage 98 when the piston 96 is in the radially withdrawn position shown in FIG. 6, and at its upper end each piston 96 has a recessed part 96b for receiving a coil spring 102 around a spring guide 103. A spring seat 104 slidable interiorly in each cylinder 92 has an opening 104a of such size as to pass guide 103 and furnishes an end support for each spring 102 and a spring 105 which extends up into the spring wall 106 provided in head 100. It should be appreciated that while air pressure is provided to cavity 96a to move the piston 96 upwardly, it is the stored energy of springs 105 and 102 which, when permitted to do so, will return the plug assist 88 from the FIG. 6A position to the radially inward position in which it is shown in FIG. 6. Air sealing O-rings 107 are used in the assembly in appropriate locations as indicated. Integrated with and projecting radially inwardly from tube 93, via an opening 108 provided in head 99, is an air supplying tube 109 which also extends through an opening 110 provided in piston 96. The tube 109 seats within a shouldered recess 111, provided in the inner end of tube 93. A slide bearing 112 is fixed in extension 113 of each cylinder 92 to slidably support this extended end of plug assist 109, and it will be seen that lateral ports 114 in tube 109 connect with the passageway opening 115 in member 109 which communicates with the passageway 95 in tube 93. In its innermost position, as shown in FIG. 6, an air chamber 116 surrounds the ports 114.

Figure 6A:
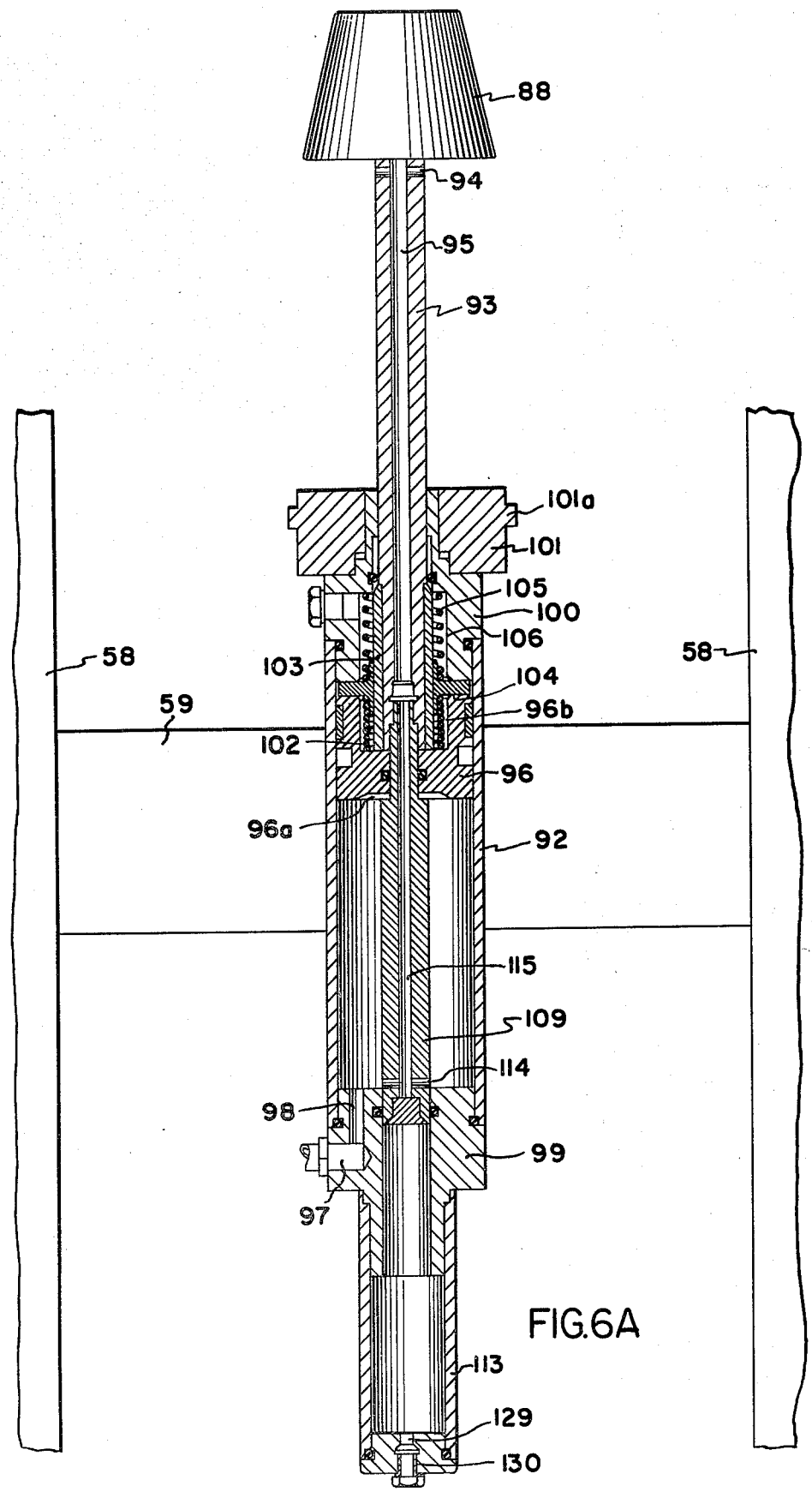
FIG. 6A is a similar view showing the plug assist member in extended position.

A common air supply 117 is provided for both driving piston 96 and supplying air via ports 94 to perform a final blow molding step after the plug assist 88 has moved the plastic in the first place mechanically into the mold cavity 78. The construction of the plug assist assembly is such, however, that air under pressure supplied through ports 97, 98, and ports 94, for moving the plastic sheet the final increment into intimate engagement with the mold cavity 78, cannot be released until the plug assist 88 reaches the outer limit of its stroke (FIG. 6A). With an assembly of this type, consistency is assured and there are no adjustments for an operator to make which might cause problems when unskilled workers are maintaining the equipment.

FIGS. 5 and 8-10 illustrate the manner in which air under pressure is supplied to the plug assist assemblies 53 at the proper time. As FIG. 6 indicates, a line 117 leads to the port 97 to connect it to an air valve assembly 118 (FIG. 5) which is mounted on shaft 56. Each assembly 118 includes a member 118a bolted to one of the drum walls 58 for rotation therewith and a cooperating, abutting, stationary member 119 separated from member 118a by a bearing 118b.

Figure 8:
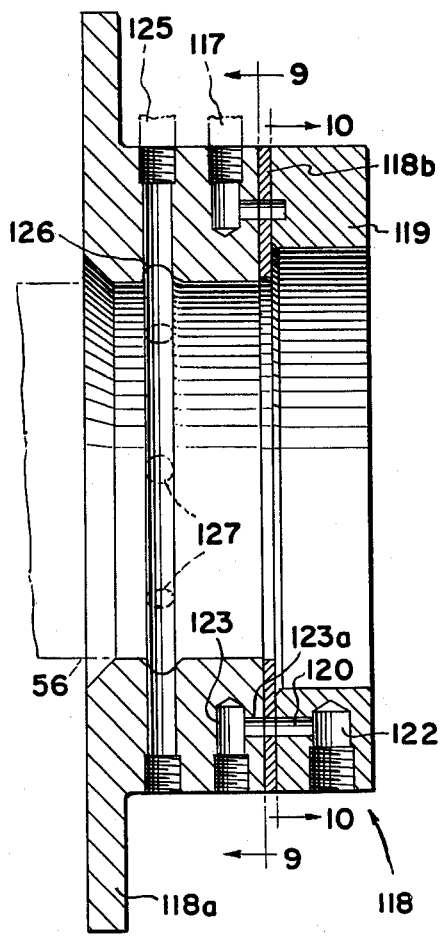
FIG. 8 is an enlarged, sectional elevational view, illustrating the air supply and exhaust valve device which is employed with the forming drum.
Figure 9:
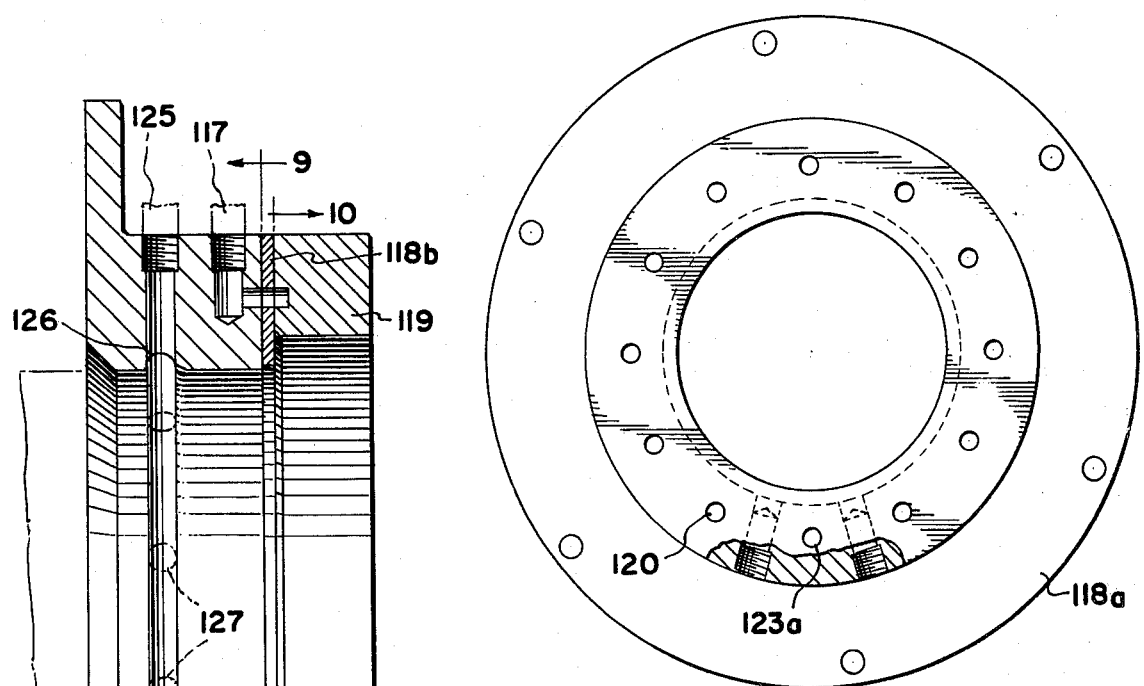
FIG. 9 is a partly sectional view, taken on the line 9—9 of FIG. 8.
Figure 10:
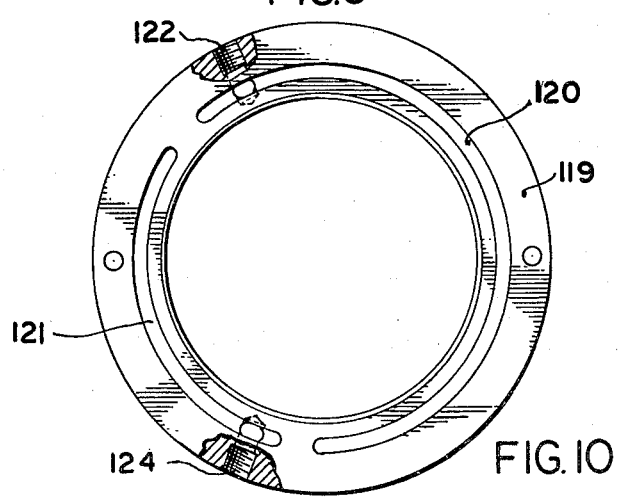
FIG. 10 is a reduced size view taken on the line 10—10 of FIG. 8.

The member 119 has air-in slots 120 and air exhaust slots 121. In FIG. 8, the relatively rotatable parts 118 and 119 are shown in a position in which it is air supply slot 120 which is communicating an air source supply passage 122 in part 119 with an annular air passage 123 provided in the part 118. An air supply hose 122a (FIG. 5) can be provided to supply air to port 122, and plainly, as long as the slot 120 is in communication with the port 123 via passage 123a, air pressure will be supplied via passage 123 to air supply hose 117 and passage 97.

Similarly, when the springs 105 and 102 are returning the piston 96b and plug assist 88 to radially inward position, air is free to exhaust from cylinder 92, via port 97, hose 117, passages 123, 123a, and 120, and air exhaust slot 121 which communicates with an exhaust port 124. Coolant water may be circulated to and from the mold assembly via lines 125 which lead to passages 126 and sealed ports 127 in the tubular shaft 56.

An opening 129 in the lower end of each extension 113 of cylinder 92 (see FIG. 6), is always in communication with atmosphere and the plug 130 is a screen plug which merely prevents dirt and foreign matter from entering. Thus, when ports 114 pass beyond slide bearing 112 on the return stroke of plug assist 88, air from chamber 91 (FIG. 5) is also free to exit via port 94, port 95, port 115 and port 114 through the plug 130.

THE RIM CURLING MECHANISM

Figure 13:
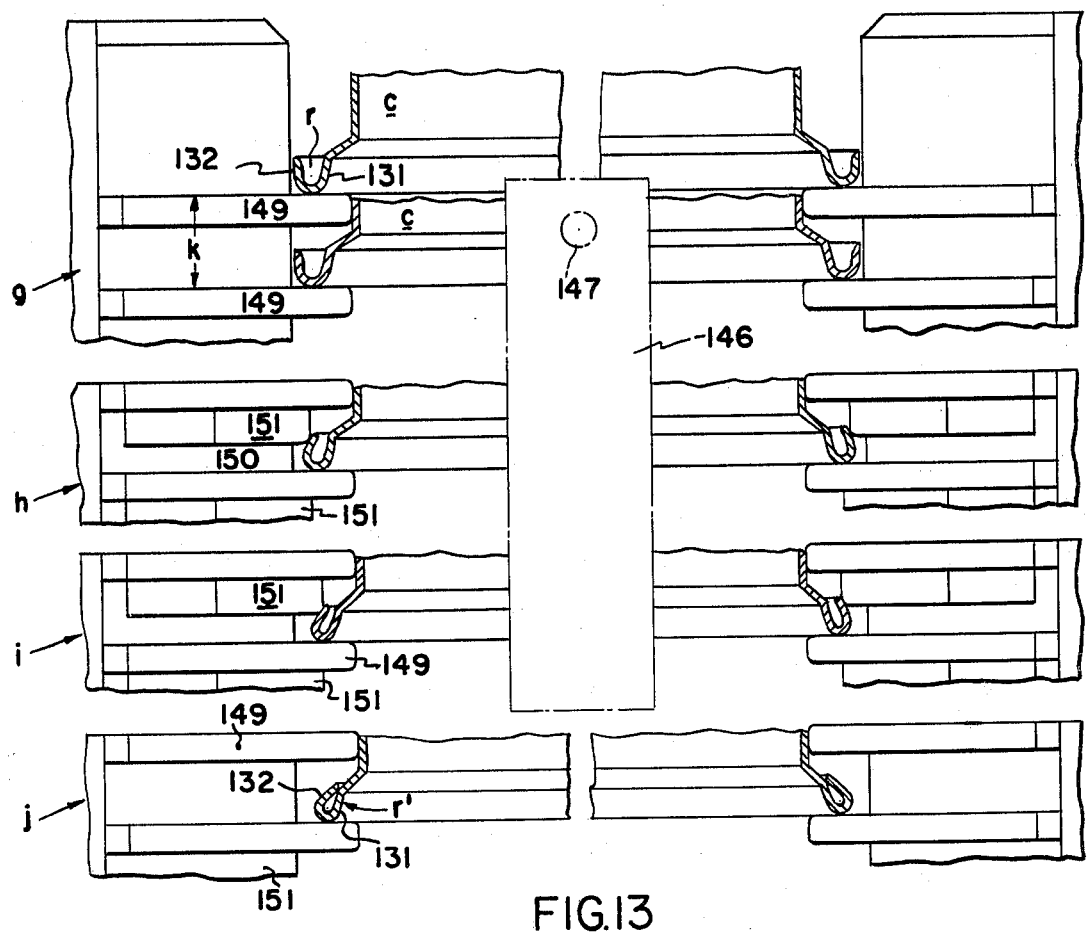
FIG. 13 is an enlarged, fragmentary view with sections of the various rim curling zones being broken away, more particularly illustrating the manner in which the containers index individually through the rim curling mechanism.

As FIG. 13 particularly indicates, when each container c is severed by the conventional trim press mechanism 16, it is released with an open, reversely turned rim part r which includes an inner portion 131 and an outer portion 132. Trim press mechanism, capable of severing the containers when position to do so is disclosed, for example, in incorporated by reference U.S. Pat. Nos. 3,217,576 and 3,461,760. The trim press may be of the type where one die is stationary or where both an upper and lower die are moved by a common drive to come together and effect the severing of the container from the web in a manner such that it falls through the lower die to the rim curling mechanism.

It is desired that the rim r be curled or folded to the configuration shown at r' in FIG. 13 in which the outer wall 132 is folded in against the inner wall 131. Various screw type mechanisms are known for forming various rim configurations and in such mechanisms either the stack is treated as a whole or it is necessary to denest the containers if they are to be treated individually.

In the case of the present system, it is desired that the containers be treated individually in each of the various steps which lead to the production of the finished container. The present rim curling mechanism accomplishes this by receiving the containers individually and releasing them individually in timed relation to the travel of the star wheel type mandrel device 18 which receives each container individually prior to moving it to a printing station.

Figure 11:
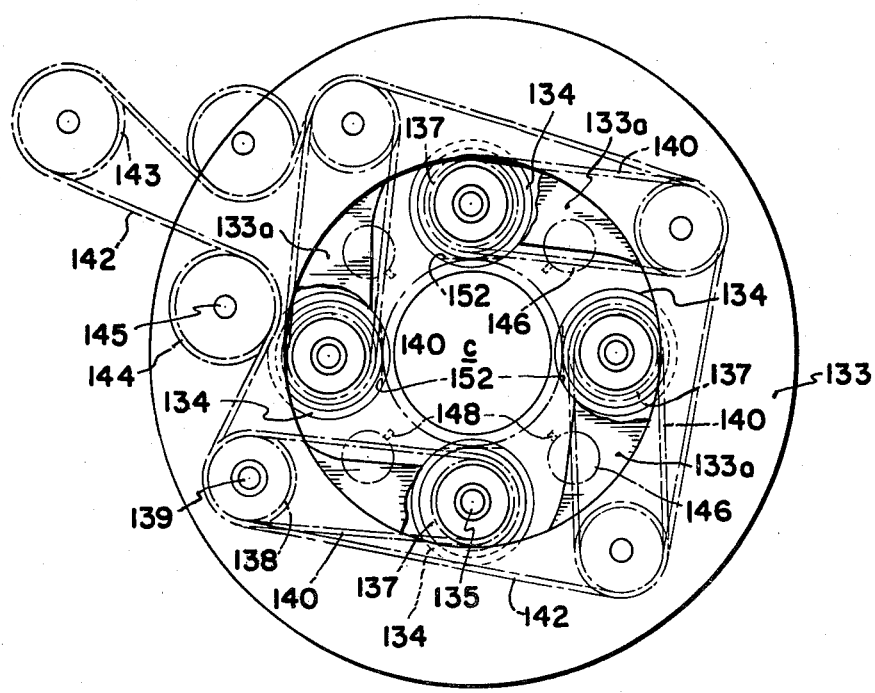
FIG. 11 is a top plan view, somewhat schematically illustrating the rim curling mechanism which is employed in the system, the four rollers which are employed being shown in the article release position.
Figure 12:
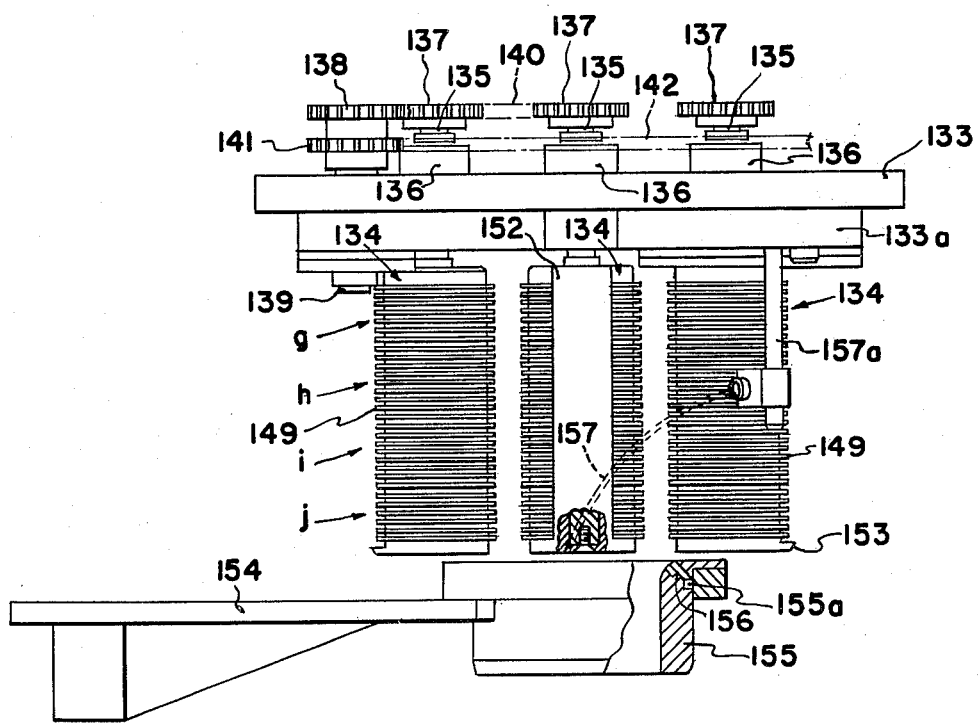
FIG. 12 is a side elevational view thereof, partly in section to show the interior of the release guide sleeve.

As shown in FIGS. 11 and 12, a top frame part 133 with supports 133a is provided for supporting a series of four flanged cylinders generally designated 134, which are of identical configuration and are arranged about the periphery of a circle as shown in FIG. 11. While these cylinders 134 may be laterally adjustably supported to receive containers of different diameter, they are shown for the sake of convenience as supported in a position to process the particular size container which is illustrated at C, and FIG. 13 illustrates the step-by-step progress of the container through the apparatus in a manner which will be presently described in detail.

As FIGS. 11 and 12 indicate, each of the cylinders 134 is mounted on a shaft 135 supported in bearings 136 on frame part 133. Each is driven by a sprocket 137 attached to the upper end of its shaft 135. Intermediate drive sprockets 138, supported on shafts 139 also carried by the frame part 133, are provided adjacent to each sprocket 137 to provide a drive therefor and these intermediate drive sprockets 138 can connect with the sprockets 137 via chains 140 as shown. Also provided on the shafts 139 are driven sprockets 141 which are in mesh with a main drive chain 142 trained around a drive sprocket 143, which can be driven via the same motor which drives the mandrel device 18, in a manner which will be described. The chain 142 also trains around idler sprockets 144 on shafts 145 supported by the frame part 133. From the foregoing, it should be clear that each of the cylinders or rollers 134 is rotated in the same direction of rotation and at the same speed, in synchronism, by the drive chain 142. As FIGS. 11 and 13 indicate, provided circumferentially between the rollers 134 and supported by the frame part 133, are air tubes 146 which may be supplied with hot air via air supply tubes 147 to release heated air at the rims of containers proceeding through the device, via nozzles 148 over virtually the axial length of the tubes 146.

Each roller 134 (FIG. 12) is made up of a series of annular flanges 149 separated by reduced girth spacer sections 150 (FIG. 13). Each of the rollers also is, in effect, divided into a series of four vertical zones g, h, i, and j which, respectively, in the particular embodiment of the invention illustrated, includes six flanges, eight flanges, eight flanges, and four flanges, respectively. In zone g, a stack height distance k is established while the rims r of the containers are being heated to a deformable temperature. In zone h, radial projections or shoulders 151 are provided to commence the rim curling operation and each of the vertically successive projections 151, which is provided in a spacer section 150, extends slightly further radially outwardly to progressively deform the container rim wall section 132. In zone i, even further radially progressively projecting shoulders or projections 151 are provided on the spacer sections 150 to further deform the rims r progressively to the point where they are released in the condition shown at r' to cooling zone j.

FIG. 12 indicates the manner in which the containers are, in effect, indexed step-by-step vertically axially through the rim curling rollers. A vertically extending slot or groove which cuts away the flanges 149 to the depth of spacer sections 150 is provided in each roller 134. The slot 152 in each roller, which extends from top to bottom thereof, is positioned with respect to the shoulder projections 151 such that the groove 152 rotationally immediately follows the shoulder 151 which, of course, is also interrupted by the groove 152. At the time each of the grooves 152 is inwardly disposed as indicated in broken lines in FIG. 11, the container will be released by the particular radially aligned flanges 149 on which it is supported. By the time it drops vertically a distance such as to be radially opposite the next level of flanges 149, the rolls and flanges will have rotated sufficiently so that it will be caught by and supported by the next level of flanges 149. It is in this manner, that the containers drop stepwise through the zones g, h, i and j. In zones g and j there are, of course, no forming shoulder projections 151 which need extend only partly circumferentially around the spacer portions 50 of the rollers 134 in zones h and i. No heat is applied during the zone j step-by-step transfer and it is in this zone that cooling of the formed rim is occurring.

Finally, each container falls to support by a bottom discharge lip 153 on each roller 154, which also is interrupted by groove 152. The lips 153 thus are circumferentially terminated to release the containers to a guide ring 155 supported by frame bracket 154. Air assist passages 156 provided in ring 155 in communication with air pressure manifold 155a, assist ejection of the containers via ring 155 and vertically angled ejection air tubes 157 in communication with air supply line 157a, may also be provided to assist this final ejection step. Each container c thus proceeds individually through the rim curling system, dropping one stack height distance k (FIG. 13) with each revolution of the rollers 134.

THE PRINTING MECHANISM

As indicated earlier, the rollers 134 are revolved synchronously with a mandrel assembly 18 which receives them individually and will now be described in more detail. Attention is invited particularly to FIGS. 14 through 17 which disclose this mandrel assembly and the associated offset printing press assembly. As these figures indicate, indexible starwheel assembly 18 is mounted on an intermittently indexing drive shaft 160. A spindle drive ring 159, which will presently be described in more detail, is also mounted on the drive shaft for rotation thereon via roller bearings 161.

The shaft 160 may be connected via a suitable conventional 8-station indexer 162, such as a geneva mechanism of conventional character, with a motor and gear box assembly 163 having a plurality of output shafts. Output shaft 164, driving a sprocket 165, can be connected to power the rim curling roller drive sprocket 143. At the same time, another output shaft 163a drives the indexer mechanism 162, which translates its rotation into partial revolutions of shaft 160 (45° in this instance) separated by short periods of dwell sufficient to receive a container on each frustoconical mandrel 166 from the rim curling mechanism release ring 155. The front end of shaft 160 is reduced as at 160a to receive a mandrel carrying hub 167 which can be keyed or otherwise suitably fixed thereto, and which is provided with recesses 168 for receiving mandrel-carrying spindle assemblies generally designated 169. The assemblies 169 each include an outer sleeve 170, having a key 171 which permits it to be radially secured in position by a ring member 172. Each mandrel 166 is mounted on a shaft or spindle 173 having bearing surfaces 174 received by shoulders 175 provided in a sleeve 170 to secure the shaft in axial position within sleeve 170. Provided on each spindle 173 is a drive sleeve 178, having a tapered drive ring 176 arranged to mate with a drive surface 177 on drive ring 159. Motion is transmitted from sleeve 178 to spindle 173 via an overridable clutch 180 which is sandwiched between them. The outer sleeve 178, normally drives spindle 173 and mandrel 166 by virtue of the frictional engagement of ring 176 with the tapered drive surface 177 on drive ring 159, but this drive can be overridden as will presently be explained.

Figure 15:
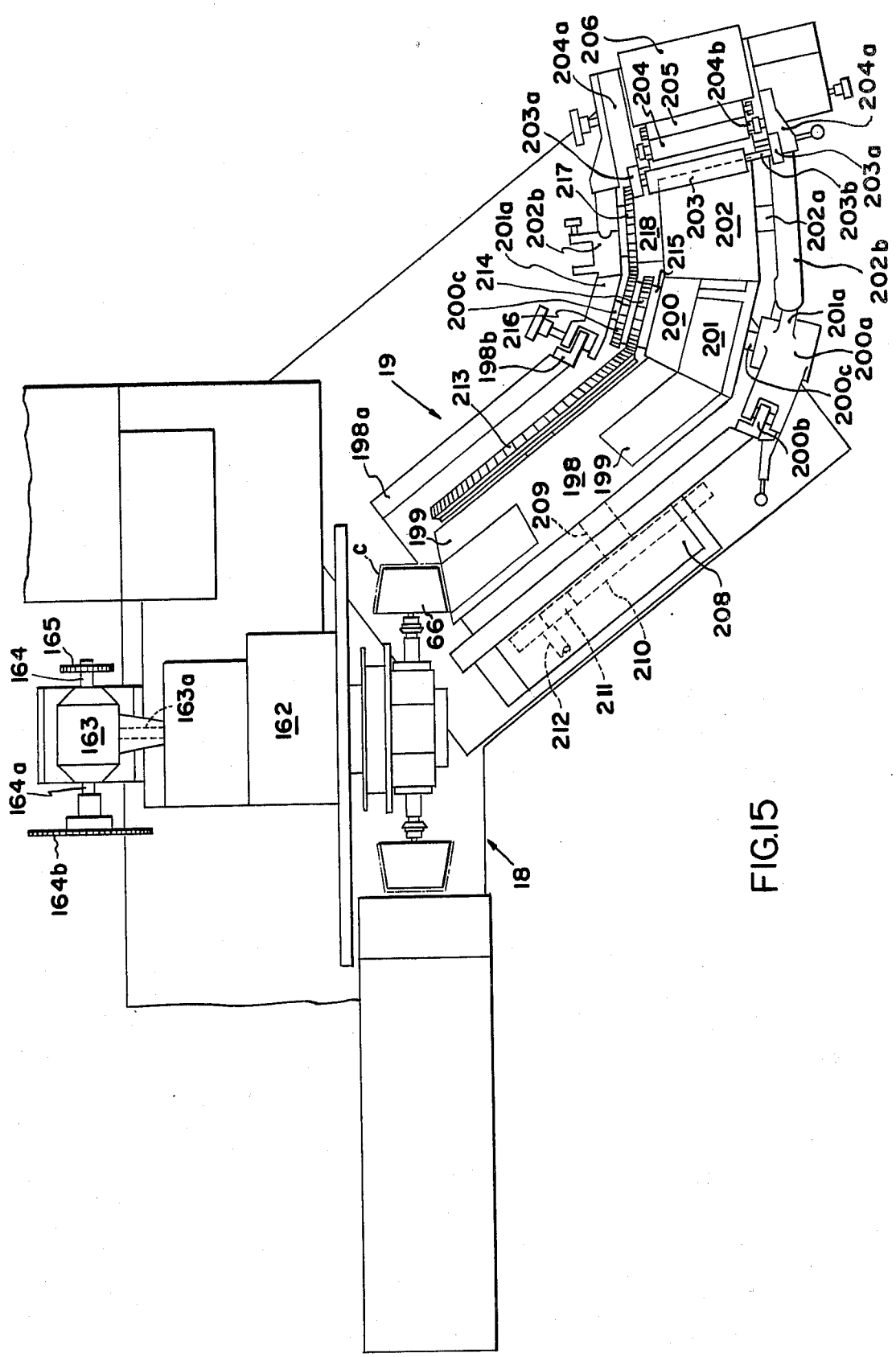
FIG. 15 is a top plan view thereof.
Figure 16:
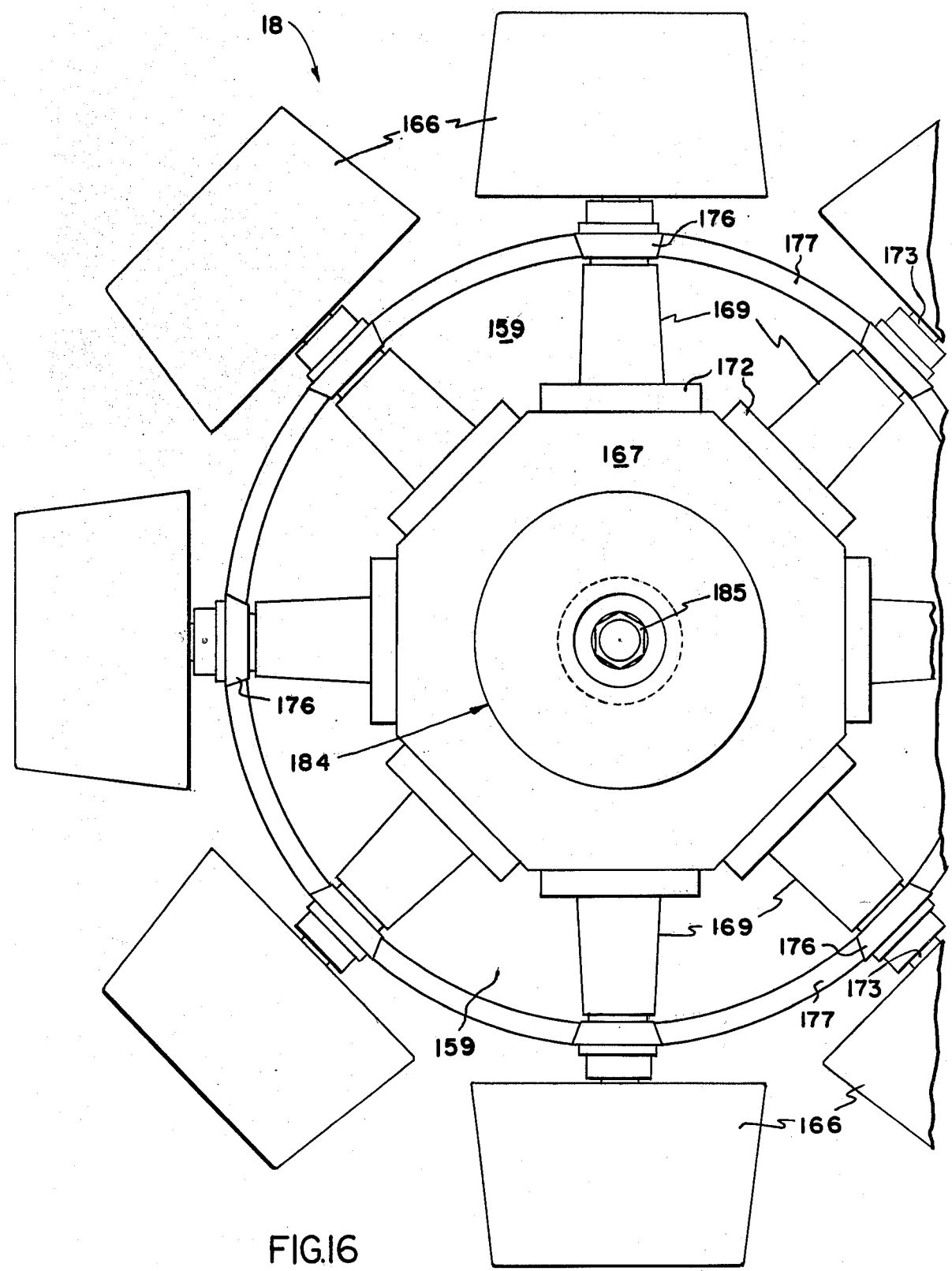
FIG. 16 is a considerably enlarged, partly fragmentary view of the mandrel device.
Figure 17:
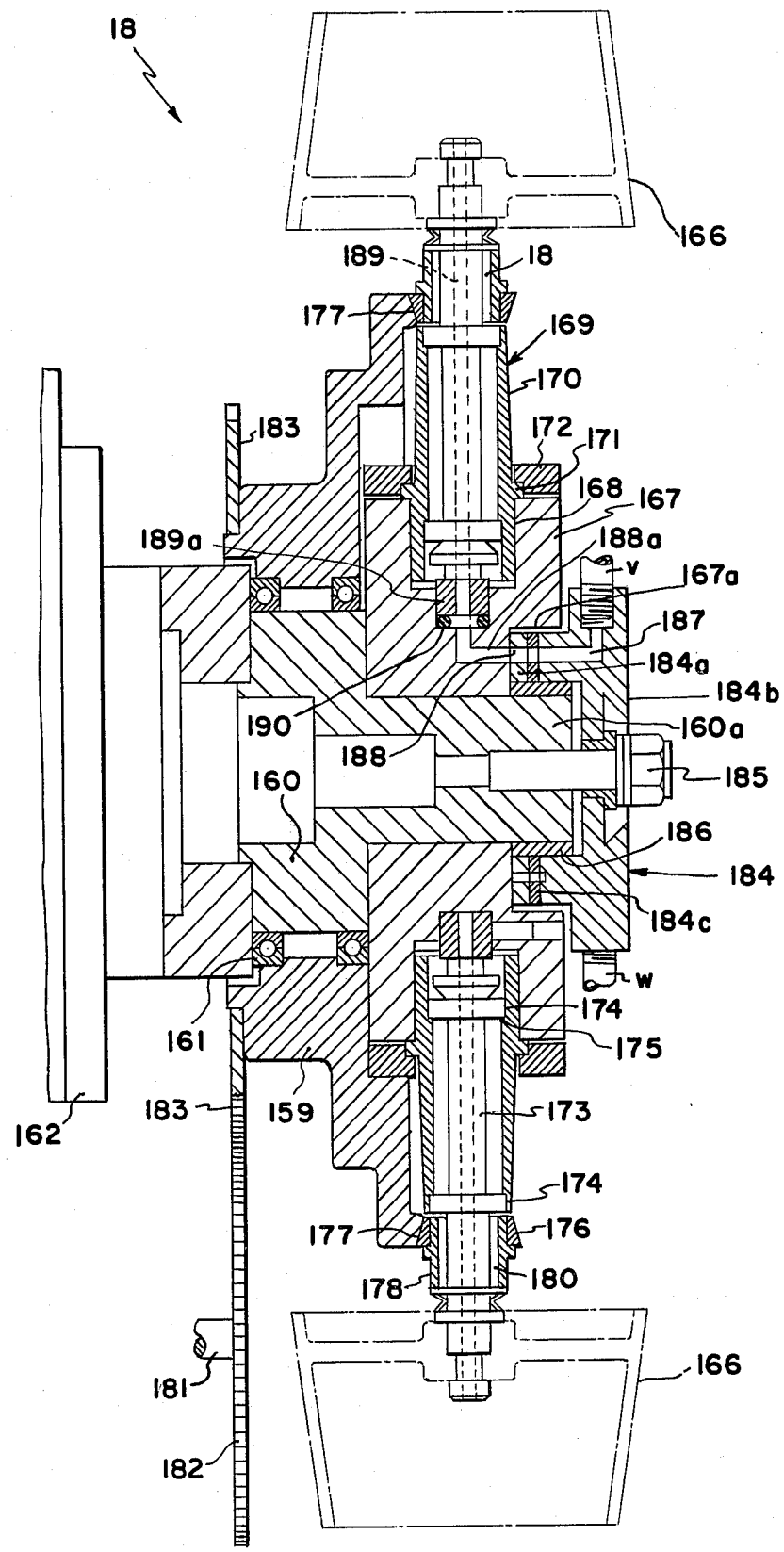
FIG. 17 is a transverse sectional view, illustrating the interior construction thereof.

As FIGS. 15 and 17 indicate, a drive sprocket 164b can be provided on the motor output shaft 164a to drive a shaft 181 and, via a gear 182, drive the gear 183 which fixes to drive ring 159. Thus, via the drive ring 176 on each mandrel support, each mandrel 166 is normally continuously revolved at a predetermined speed. The overriding clutch 180 can comprise a conventional Formsprag clutch of the type which normally transmits rotation at a particular speed, but can be overridden when necessary, and the purpose of this construction will be later explained in detail.

It will be noted that the front wall of spindle carrier 167 is recessed as at 167a and that a valve assembly 184 is received thereon. The threaded stud and nut assembly 185 positions the assembly 184 and a bearing sleeve 186 can be provided as shown between the shaft section 160b and valve assembly 184. The assembly 184 similarly includes rotatably indexing part 184a and a nonindexing part 184b separated by bearing 184c.

Figure 14:
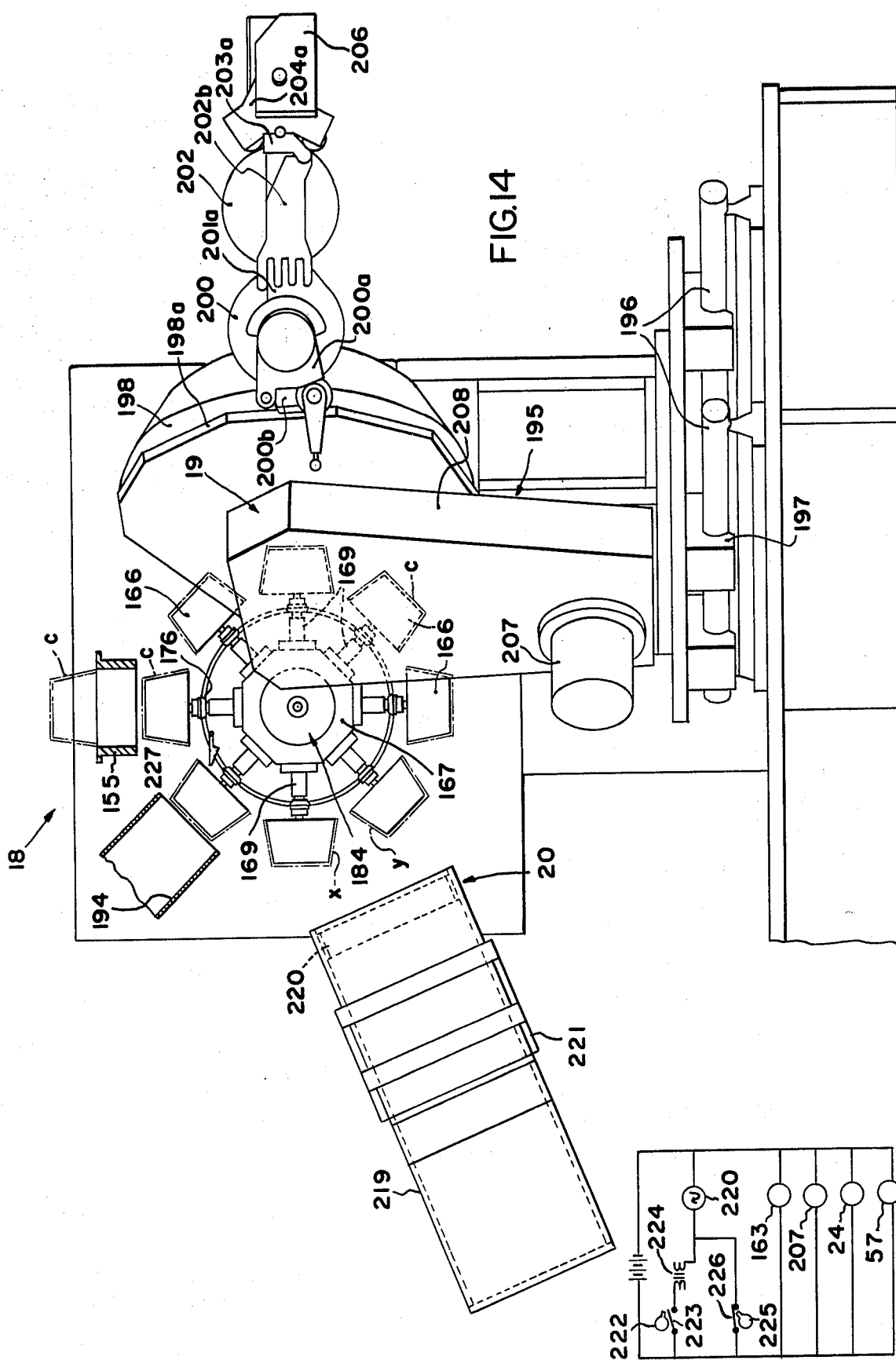
FIG. 14 is a front elevational view illustrating the container supporting mandrel device for receiving containers individually from the rim curling mechanism and processing them through the printing and ink drying mechanism.

Provided in part 184b is a slot 187 connected with vacuum hose v, which throughout the great majority of the indexing path of travel of shaft 160, communicates with the passages 188 (one for each mandrel) in part 184a and the passage 188a in mandrel carrier ring 167. The passages 188 communicate with spindle passages 189 for the purpose of applying either a vacuum or air under pressure to the interior of a mandrel 166, depending upon whether the container is to be held in position on the mandrel 166, or has rotated to the ejection station where it is to be ejected. The air hose w connects to a similar very short slot (in a circumferentially removed position from slot 187) in valve 184 to furnish ejection air to the passage 188 only when a particular mandrel 166 arrives at container ejection station 193 (FIG. 14). An O-ring seal 190 is provided to seal each spindle base part 189a.

While not shown, a sensing device can be used in connection with port 187 so that when vacuum is applied at a time when no container is received on a mandrel 166, the sensing device registers and the printer is retracted and does not print the side of the mandrel. Typically, as the drawings, and particularly FIG. 14, illustrate, mandrel assembly 167 supports a series of eight mandrels 166 in uniformly spaced circumferential position, and indexes them a distance of 45° between periods of dwell.

The containers c are indexed typically in two steps to the printing station 19. The drying station 20, which is shown in FIG. 14, is located almost 180° distant therefrom and is adjacent to ejection station 193, at which the containers c are blown into an air ejection tube 194, which leads to the stacking station 21.

As FIG. 14 indicates, the printing head 195 which is shown, is mounted for forward and rearward movement on a pair of guide rods 196, there being dependent way members 197, provided for supporting the printing head 195, and a motor (not shown) such, for example, as a conventional pneumatic cylinder connected between the frame F and printing head assembly 195 for moving it to and from printing position.

The offset printing mechanism is particularly designed to print the tapered side wall of the container c and includes a frustoconical blanket cylinder 198, having printing blankets 199 thereon. A frame part 198a, on which blanket cylinder 198 is mounted, supports a plate 200a, via link 200b, which journals shaft 200c supporting frustoconical plate cylinder 200, which has a printing plate 201 section thereon. At its opposite end, shaft 200c is journaled by an arm part 201a connected to frame part 198b. Arms 201a support brackets 202b which journals the shaft 202a rotatably supporting tapered form roll 202, which is in operative engagement with the usual oscillating cylinder 203. The oscillating roll is supplied with ink via a transfer roll 204, a dab roll 205, and the usual wiper and ink fountain assembly 206. Brackets 203a and 204a support the roll cylinder 203, shaft 203b and transfer roll shaft 204b. While the various supports may be adjustable to "fine tune" the engagement of the various printing ink transfer parts, such forms no part of the present invention and will not be described herein. Motor 207 may be employed to revolve the blanket cylinder 198 and other elements via chain or gear drives in housing 208.

As shown in FIG. 15, the blanket cylinder drive shaft 209 may be connected with a gear 210 driven by a gear 211 mounted on a shaft 212 which, through other gearing (not shown), is driven by motor 207. It will be observed that a bevel gear 213 is fixed to the opposite end of blanket cylinder 198 and is in mesh with a gear 214 provided on the plate cylinder shaft 200c, so that plate cylinder 200 is driven in synchronism with the blanket cylinder 198. A bevel gear 216 is also mounted on the shaft 200c in mesh with a bevel gear 217 provided on the form roller shaft 202a. The bevel gears 213, 214, 216 and 217 have what are termed beveloid-shaped teeth. The elements 203–205 are friction driven by the form roll in the conventional manner and the fountain roller (not shown) is driven by a gear train connected with gear 217. This is conventional in offset printing systems. U.S. Pat. Nos. 3,827,356 and 3,259,060 (incorporated herein by reference) disclose typical systems. What is considered important is the manner in which the frustoconical cylinders 198, 200 and 202 are driven from the blanket cylinder 198 via the gears 213, 214 216 and 217 to provide a system which can print the tapered side walls of the containers c without scuffing them, and print them at rates of two hundred containers per minute or more, dependent on the diameter of the containers being manufactured.

At drying station 20, to which containers c are indexed after they have been printed, an elongate housing 219 is provided which is open at its inner or front end and spans two index stations. Provided within the tube 219 is an ultra violet lamp 220 which is powered by a pulsing circuit to be described. A frame 221 may be provided to secure the housing 219 in the position indicated.

In FIG. 15, a schematic circuit is shown for operating the ultra violet lamp 220 in synchronism with the mandrel indexer 18 which moves the containers c which are printed to a position opposite the drying station 20 such that two at a time are essentially spanned by the lamp 220. The motor 163 for indexing the mandrels 166 via the eight station indexer 162, also drives a cam 222 mounted to momentarily close the spring returned pulsing switch 223 which, via transformer 224, delivers a high intensity surge of power, typically in the neighborhood of 3000 watts, to lamp 220. At the same time, the cam 225, which is also mounted on the same shaft as cam 222, opens normally spring closed switch 226 to disable the parallel circuit which normally supplies a lower intensity power, typically in the neighborhood of 600 watts, to lamp 220. The high intensity pulse occurs at a time when two containers are in the dwell position with their continuously rotating bottom surfaces and side walls exposed as at x and y to the ultraviolet rays. Experimentation has shown that the combination of the low and high pulse thermal energy charge accomplishes curing and drying of the printing ink very efficiently. The high energy pulse is of such duration, and synchronized with the axial rotation of the mandrels 166, that at least one revolution of the containers on the mandrels occurs during the period of the high intensity pulse. Moreover, as will be clear from the drawing, because each violet lamp, in effect, spans two mandrels in the dwell position, each container is essentially subjected to two high intensity pulses during the two station drying procedure. When a container c on the mandrel 166 is indexed to the position opposite tube 193, a blast of air delivered through opening 180 will serve to discharge it via tube 194 and a jet of air delivered by a nozzle 227 can also be directed at the very edge of the mandrel 166 to assist in this air ejection operation.

THE OPERATION

Typically, thin wall polystyrene plastics containers will be produced in sizes ranging from 8 to 34 ounces at a rate of 150 to 200 units per minute. Reject rates will be extremely low and production costs can be greatly reduced over other conventional processing methods.

While only a single printing assembly has been illustrated and described, it is to be understood that identical mechanisms can supply up to five colors, for example, to the printing blanket cylinder 198 with conventional printing inks of a resin or other nature, which cure when subjected to high intensity thermal energy.

The motor 24, which drives the bubble collapsing roll units 12, is driven synchronously with the drum and cam driving motor 57, the motor 163 for driving the indexer 162, the lip curling cylinders 134, and spindle drive surfaces 177, and the blanket cylinder driving motor 207, to continuously produce containers c on a one-at-a-time basis. This, of course, further mandates the trim press 16 to operate at a predetermined speed to deliver single containers c to the lip rolling mechanism 17.

Dependent on the particular material being processed, the turntable unit 15 is revolved to a particular position and cam lock 47 is manually applied to lock the turntable 36 in angularly adjusted position. The fused double wall web P feeds to the molding drum 14 at exactly the peripheral speed of the drum where it is clamped in position between the successive housing elements 90, and mold covers 52 clamp rings 75 as covers 52 close. The covers 52 remain closed throughout substantially 180° of revolution and then commerce to open to release the web P, a cover being shown in the partially open position at s.

At the trim press station 16, the containers are severed from the plastic web P and drop immediately to the lip roller unit 27. The manner in which the containers c drop or index one vertical increment at a time from one level of flanges 149 to the next has been described. During passage through the first stage g, the containers c are heated by the hot air nozzle which essentially may be connected to, what amounts to an electric hair dryer (as a conventional hot air source), to supply sufficient hot air to heat the rims r to a plastic deformable state. The projections 151, which each graduate in terms of circumferential girth, then progressively form the rims r, in the manner indicated in FIG. 13. Each of the shoulder projections 151 in descending order in zones h and i, in effect, takes up in girth, where the previous shoulder 151 terminates, so that deformation through zones h and i is progressive in character. The hot air heating unit terminates as indicated in FIG. 13, above zone j, which is a cooling zone, so that by the time a container c is delivered through guide tube 155 to a waiting mandrel 166, the rim r has commenced to harden and will not be disturbed by the further processing which occurs.

With the tapered blanket cylinder 198 which is shown, side wall skidding is avoided and non-blurred images are transferred to the container side walls. As indicated earlier, the mandrels 166, are continuously frictionally driven via the drive surface 177, provided on drive ring 159. The drive of blanket cylinder 198, is in a direction of rotation such that it will tend to drive the container c on the mandrel being printed in the same direction of rotation as does drive surface 177. The peripheral speed of the three blankets 199 on cylinder 198 is slightly faster and the overriding clutches 180 permit the blanket to revolve the containers slightly faster during the image transfer. Formsprag Company of Warren, Michigan, U.S.A. manufactures overriding clutches which may be used conveniently to transmit rotation in one direction of rotation while preventing it in the opposite direction of rotation. While not shown, it is to be understood that for each color that is used, there is a separate plate cylinder 200, forming cylinder 202 and a separate oscillating roll 204, dab roll 205 and ink fountain 206. Because the cylinder 198 is driven synchronously with the indexer 162, the container 166 will be indexed after printing, during a time interval when the space between blankets 199 is opposite the mandrel 166 so blurring of the image will not occur.

At the time a container c descends over the mandrel 166, vacuum is applied through the mandrel via port 180 to hold the container in place thereon, so that it rotates continuously with the mandrel. The vacuum remains in communication with port 180 to insure rotation of the container c with the spindle until such time as the particular container is indexed around to the ejection tube 194. Generally speaking, the time of dwell is about twice the time required by the mandrel to index through a 45° interval.

Because it is possible to dry the ink while the container c is on the mandrel device, costly oven structures can be avoided. The ultra violet device, which is employed, can be of the type mentioned generally in U.S. Pat. No. 3,872,349 and 3,911,318. Because the containers, when in dwell position, largely block the light, the high intensity pulse is not dangerous to the operator.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. In a continuous plastics forming system having an extruder for continuously issuing a heated plastic in the form of an elongated web; a downstream forming station with means for deforming selected portions of the continuously moving web, while still warm and deformable, to the shape of articles supported and interconnected by undeformed intervals of web; mechanism for separating the articles from the web; and mechanism for moving the web in a path to the forming station and separating mechanism; said deforming means including an endless member about which said web is trained, having a plurality of generally radially extending plug assist passages therein open to the periphery thereof and said web, and a closable cover for each passage comprised of a female mold cavity; means synchronized with said web moving mechanism for moving said endless member continuously at the rate of speed of the web moving to the endless member; and means for moving said covers consecutively to closed position to clamp the web to the endless member and after a predetermined forming interval to then move the covers to open position to release the deformed web:

the improvement wherein: a piston driven plug assist assembly is mounted in each of said passages to deform the web initially into the mold cavity in each cover when the cover is in closed position; said assemblies each including a cylinder with a piston to which a plug assist mechanism having a tubular support rod is fixed; there being air emission ports in said plug assist mechanisms to create a differential pressure to move the web into intimate engagement with the mold cavities as a final deforming step; a common compressed air supply system for supplying air to each plug assist cylinder at air inlet passage means radially inward of each piston; and an air flow inlet port in the inner end of each tubular support rod located radially inward of said air inlet passage when the piston is in radially inner position, positioned axially to communicate with the air inlet passage means only after each piston has been moved to radially outward position, to control the time of air emission through said air emission ports.

2. The subject matter of claim 1 wherein return spring mechanism within said cylinder is provided radially outwardly of said piston to be compressed when the piston is moved radially outwardly; and means is provided for discommunicating said common air supply system from each plug assist cylinder and communicating vent means with each cylinder at the air inlet position at a predetermined time when said spring mechanism is to return said piston and plug assist mechanism.

3. The subject matter of claims 1 or 2 wherein said cylinder has vent means permitting venting of said support rod after said air inflow inlet port has been moved inwardly of said air inlet passage means.

4. The apparatus of claim 1 wherein a set of circumferentially spaced rollers having axially spaced apart, radially aligned separate grooves is provided in communication with the mechanism for separating containers from the web to define a series of radially aligned rim supporting flanges: means is provided for rotating said rollers in unison and timed relation; and said rollers are configured to apply a revolving force to the container in increments separated by periods of dwell during which said containers are freed for stepwise axial movement from flange to flange, said rollers being configured to radially deform the rims during the time said revolving force is applied to them.

5. The apparatus defined in claim 4 wherein indexible multi-mandrel means having container receiving mandrels thereon is provided having a path of movement which includes a load station adjacent the rim deforming rollers for receiving containers therefrom; side wall offset printing mechanism adjacent the path of movement at a printing station to which the indexible mandrel means delivers containers and then passes them on to a container release station; and mechanism is provided for indexing said multi-mandrel means in increments of travel separated by periods of dwell during which the mandrels of said multi-mandrel means are positioned at such stations.

6. The mechanism of claim 5 wherein an ink drying station is provided between said printing station and said container release station; a thermal energy supplying unit is provided at said ink drying station; and drive means is provided for revolving said mandrels so that the entire side wall surfaces thereof are exposed to said thermal energy supplying unit.

7. A plastics container forming system comprising: a frame; means thereon for continuously advancing a heated plastic in the form of an elongated web; an endless member supported by said frame, about which said web is trained, having a plurality of generally radially extending plug assist passages therein open to the periphery thereof and said web; a closable cover mounted on said endless member to cooperate with each plug assist passage; a mold in each cover; and means for moving the covers successively to closed position to clamp the web to the endless member and, after a predetermined forming interval, to then move the covers to open position to release the formed web; the improvement wherein: a piston driven plug assist assembly is mounted in each of said passages to deform the web initially into the mold in each cover when the cover is in closed position; said assemblies each including a cylinder with a piston to which a plug assist mechanism having a tubular support rod is connected; there being air emission ports in said plug assist mechanisms to create a differential pressure to move the web into intimate engagement with the mold as a final deforming step; supply means for supplying air under pressure to each plug assist cylinder at air inlet passage means located in said cylinder wall radially inwardly of each piston; and an air flow inlet port in the inner end of each tubular support rod located radially inward of said air inlet passage means in the cylinder when the piston is in radially innermost position, positioned axially to communicate with the air inlet passage means when each piston has been moved to radially outward position.

8. In a plastics container forming system having mechanism for advancing a heated plastic in the form of a web; a downstream forming station with means for deforming selected portions of the web to the shape of containers with peripherally projecting rims supported and interconnected by undeformed intervals of web; mechanism for separating the containers from the web; and mechanism for moving the web in a path to the forming station and separating mechanism; the improvement wherein: a set of circumferentially spaced rollers having axially spaced apart, radially aligned separate grooves is provided to define a series of radially aligned rim supporting flanges supporting the rims for stepwise axial movement of the containers axially between said rollers, the flanges being provided with cut out portions which permit the containers to pass axially from one set of radially aligned flanges to another when the cut out portions of the respective rollers are in a radially inward position and certain of the grooves having radial projections to radially deform the rims; and means provided for rotating said rollers in unison and timed relation.

9. The further improved subject matter of claim 8 wherein said rollers are vertically disposed and said cut out portions extend vertically in axial alignment on each roller from one end of the roller to the other, and the speed of rotation of the rollers is such that, by the time a container has been released at the cut out portions of one level of flanges and dropped to the next level of flanges, the next level of flanges has revolved sufficiently to dispose the cut out sections in the next level of flanges circumferentially beyond the container rim which will be caught by and supported on the next level of flanges.

10. The further improved subject matter of claims 8 or 9 wherein means is provided for directing a hot air flow at the rims of said containers to heat the rims to a deformable temperature prior to the time they reach said radial projections and to maintain them at such deformable temperature while said projections are radially deforming the rims, said means for directing a hot air flow being disposed circumferentially between said rollers.

11. The further improved subject matter of claim 9 wherein rim heating means is provided adjacent the rollers and said levels of flanges are divided in a first series of axially spaced flanges which define a rim heating zone, another series of axially spaced rim supporting flanges which define a rim deforming zone, and still another series of rim supporting flanges which define a cooling zone; said radial projections being provided only in the rim deforming zone.

12. A plastics container forming system comprising a frame; a set of circumferentially spaced, vertically disposed, parallel rollers between which containers with rims to be curled are to be fed axially; means for revolving said rollers at the same speed in unison; each roller having axially spaced apart, radially aligned, separate grooves provided to define a series of rim supporting flanges at different levels for supporting the rims for stepwise axial movement of the containers axially between the rollers, the flanges of the respective rollers being in radial alignment and being provided with cut out portions which permit the containers to pass axially from one radial aligned series of flanges to another when the cut out portions of the respective rollers are in a radially inward position and do not support the rims of the containers; and radial projections of increasing girth provided on said rollers to radially deform the rims at the time they dwell axially between axial indexes from one level of flanges to another.

13. The further improved subject matter of claim 12 wherein means is provided upstream from said projections for heating said rims to a deformable state.

14. The further improved subject matter of claims 12 or 13 wherein common drive means is provided for rotating said rollers in timed relation to ensure that all of the rollers have their cut out portions in a radially inward position at the same time to release the container rims from one level of flanges and for rotating the rollers at such a speed as to receive them on the next level of flanges by the time they have dropped one step.

15. The further improved subject matter of claims 12 or 13 wherein discharge lips are provided on the lower ends of said rollers which extend only partially circumferentially on said rollers and are so angularly related that upon rotation of said rollers in unison they are removed circumferentially from the container rims to simultaneously release a container whose rim rim has been curled.

16. The subject matter of claim 8 wherein a container transporting mandrel wheel having circumferentially spaced mandrels is provided adjacent said rollers to receive containers individually therefrom said rollers extend axially vertically and release containers in timed relation to the circumferentially spaced mandrels; and means is provided for indexing the mandrel wheel in timed relation with the rotation of said rollers.

17. In a continuous plastics container forming system having mechanism for advancing a heated plastic in the form of a web; a downstream molding station with means for deforming selected portions of the web to the shape of containers which are supported and interconnected by undeformed intervals of web; mechanism for separating the containers from the web; and mechanism for moving the web in a path to the forming station and separating mechanism; the improvement wherein: a set of circumferentially spaced rim deforming rollers is provided defining an axial pathway between them for the containers; means is provided thereon for releasing the containers one at a time; indexible transfer means having container receiving mandrels thereon is provided and has a path of movement which moves containers between a load station adjacent the release end of said rollers and a container release station; mechanism is provided for indexing said transfer means in increments of travel separated by periods of dwell during which the mandrels are positioned at said stations; and means is provided for driving the means for releasing the containers from said rollers synchronously with the transfer means.

18. The further improved subject matter of claim 17 in which container side wall offset printing mechanism is provided adjacent said path of movement at a printing station; and a thermal energy supply unit is provided adjacent said path downstream from the printing mechanism at an ink drying station; and drive means is provided for revolving said mandrels so that the entire side wall surfaces thereof are exposed to said thermal energy supplying unit.

19. The further improved subject matter of claim 18 wherein said thermal energy supplying unit comprises an ultraviolet lamp directing a beam of drying energy; and said transfer means is an endlessly traveling member which, during a period of dwell, disposes a pair of containers at the drying station with the beam spanning and playing on the side walls of a pair of containers.

20. The further improved subject matter of claim 19 wherein means is provided for energizing said lamp to produce a high wattage pulse during each period of dwell.

21. The further improved subject matter of claim 20 wherein means is provided for energizing said lamp to produce a much lower wattage beam when said mandrels are traveling between stations.

22. The further improved subject matter of claim 17 wherein said molding station deforming means is configured to form containers with tapered side walls and said offset printing mechanism includes a blanket cylinder having a complementally tapering side wall; and a plate cylinder having a complementally tapering side wall adjacent the blanket cylinder; a drive gear revolvable with said blanket cylinder on the axis thereof; and a driven gear for driving said plate cylinder fixed on the axis of said plate cylinder in mesh with said drive gear to be driven thereby.

23. In a container forming system, a frame; rim deforming mechanism thereon for curling the rims of containers and releasing them one at a time; container side wall printing mechanism provided at a printing station; indexible transfer means having container receiving mandrels thereon; means mounting said transfer means for continuous travel in a path of movement which moves containers to a load station adjacent the release end of said rim deforming mechanism, thence to a printing station, thence to a container release station, and thence back to the load station; mechanism for indexing said transfer means in increments of travel separated by periods of dwell during which the mandrels are positioned at said stations; and means for driving the rim deforming mechanism synchronously with the transfer means.

24. In a container processing system an indexible shaft; a revolvable carrier with mandrels for receiving containers thereon mounted on said shaft and movable in a path of revolution; loading mechanism adjacent said path for loading containers individually to said mandrels; offset printing mechanism adjacent said path and downstream from the loading mechanism for printing ink on container side wall surfaces at a printing station; ink drying means adjacent said path downstream from the printing mechanism for applying thermal energy to said side wall surfaces to dry said ink at a container drying station; means adjacent said path downstream from said ink drying means for receiving said containers at a container discharge station; spindles on said carrier projecting radially and having said mandrels on the outer ends thereof; mechanism for indexing said shaft and mandrels in increments of revolution to said stations, separated by periods of dwell during which said mandrels are disposed at said stations; a drive element rotatably supported on said shaft; driving means for revolving said drive member; and drive parts on said spindles maintained in driving engagement with said driving element during increments of travel and periods of dwell for continuously revolving said spindles and the mandrels thereon.

25. The apparatus as set forth in claim 24 wherein said drive element comprises a disc with an axially inclined friction drive surface; and sleeves with complementally inclined surfaces are provided on said spindles.

26. The apparatus defined in claim 25 wherein overridable clutch means is provided between said spindle sleeves and spindles for transferring the rotary drive of said sleeves to said spindles; said offset printing means including an ink applying blanket cylinder for engaging the side walls of containers brought to said printing station by said mandrels; and means for driving said blanket cylinder in a direction to drive said containers in the same direction as said sleeves are driven and at a slightly greater speed of rotation.

27. The apparatus as defined in claim 24 in which discommunicatable vacuum applying passages in said spindles are communicable with a vacuum source for holding said containers on said mandrels.

28. The apparatus as defined in claim 24 in which discommunicatable air applying passages are provided in said spindles communicable with an air source for blowing said containers off said mandrels at the discharge station.

29. In a continuous plastics container manufacturing system having mechanism for advancing a heated plastic in the form of a web having a path of travel; a downstream molding station adjacent said path with means for deforming selected portions of the web to the shape of containers which are supported and interconnected by undeformed intervals of web; mechanism adjacent said path for separating the containers from the web; a load mechanism adjacent the separating mechanism for receiving containers separated from the web at a load station; container side wall offset printing mechanism adjacent the load mechanism for printing the side walls of the separated containers at a printing station; and means adjacent the printing mechanism for applying thermal energy to the containers at an ink drying station; the improvement wherein indexible transfer means having container receiving mandrels thereon is provided which has a path of movement for moving containers from the load station to the printing station, and for moving containers from the printing station to the drying station; means for indexing said transfer means in increments of travel separated by periods of dwell during which the mandrels are positioned at said stations is provided; and means is provided for revolving said mandrels at said drying station to expose the circumferential area of said container side wall to the thermal energy applying means.

30. In a continuous plastics container manufacturing system having mechanism for advancing a heated plastic in the form of a web having a path of travel; a downstream molding station, adjacent said path with means for deforming selected portions of the web to the shape of containers with tapered side walls, which are supported and interconnected by undeformed intervals of web; mechanism adjacent said path for separating the containers from the web; a load mechanism adjacent the separating mechanism for receiving containers separated from the web at a load station; container side wall offset printing mechanism adjacent the load mechanism for printing the side walls of the separated containers at a printing station; indexible transfer means having container receiving tapered mandrels thereon which has a path of movement for moving containers from the load station to the printing station; said printing means including a blanket cylinder having a complementally tapering side wall and a cylinder for transmitting images to said blanket cylinder having also a complementally tapering side wall adjacent the blanket cylinder; each of said blanket cylinder and transmitting cylinder being mounted on shafts with axes which in plan view intersect at an acute angle; and a bevel type gear mounted on each of said shafts in mesh such that one cylinder drives the other cylinder synchronously.

31. In a continuous plastics container manufacturing system having mechanism for advancing a heated plastic in the form of a web; a downstream molding station with means for deforming selected portions of the web to the shape of containers with side walls, which are supported and interconnected by undeformed intervals of web; mechanism for separating the containers from the web; container side wall offset printing mechanism provided at a printing station; a load station for receiving containers separated from the web; indexible transfer means having container receiving mandrels thereon which has a path of movement for moving containers from the load station to the printing station; means associated with the mandrels for selectively gripping containers loaded thereto and releasing them; overridable drive mechanism for revolving said mandrels on the transfer means for driving the containers thereon in one direction of rotation; said printing means including a blanket cylinder having a complementally disposed side wall to the side walls of containers on said mandrels; and means for driving the blanket cylinder in a direction to drive said containers in the same direction of rotation as said mandrels and containers and at a slightly greater speed of rotation.

* * * * *